US012147833B1

(12) United States Patent
Krishna et al.

(10) Patent No.: US 12,147,833 B1
(45) Date of Patent: Nov. 19, 2024

(54) WORKFLOW RUNTIME ENVIRONMENT WITH DISTRIBUTED CONTROL AND NETWORKED SERVICE INVOCATIONS HAVING SEPARATE LOGICAL AND PHYSICAL ENDPOINT IDENTIFIERS

(71) Applicant: dQuora Labs, Inc., Campbell, CA (US)

(72) Inventors: Ashish Krishna, Cupertino, CA (US); Dino Farinacci, San Jose, CA (US); Walter H. Blomquist, Campbell, CA (US)

(73) Assignee: dQuora Labs, Inc., Campbell, CA (US)

( * ) Notice: Subject to any disclaimer, the term of this patent is extended or adjusted under 35 U.S.C. 154(b) by 397 days.

(21) Appl. No.: 17/478,866

(22) Filed: Sep. 17, 2021

Related U.S. Application Data

(60) Provisional application No. 63/086,497, filed on Oct. 1, 2020.

(51) Int. Cl.
*G06F 9/48* (2006.01)
*G06F 9/50* (2006.01)
(Continued)

(52) U.S. Cl.
CPC .......... *G06F 9/4881* (2013.01); *G06F 9/4806* (2013.01); *G06F 9/5038* (2013.01);
(Continued)

(58) Field of Classification Search
CPC .................................................... G06F 9/4881
See application file for complete search history.

(56) References Cited

U.S. PATENT DOCUMENTS

2010/0287377 A1  11/2010  Lim
2013/0166703 A1*  6/2013  Hammer ............. H04L 41/5054
                                                          709/220
(Continued)

OTHER PUBLICATIONS

Coras, Florin, et al., "On the Scalability of LISP Mappings Caches", Universitat Politecnica de Catalunya (BarcelonaTECH), Barcelona, Spain, Apr. 14, 2015, 14 pages.
(Continued)

*Primary Examiner* — Charlie Sun
(74) *Attorney, Agent, or Firm* — Compass IP Law PC

(57) ABSTRACT

A method is described. The method includes building a description of a workflow. The method also includes creating an embedded workflow description by embedding the description of the workflow with logical identifiers of different instances of services that are available over a network. The method also includes repeatedly performing a) and b) below to execute the embedded workflow: a) dispatching the embedded workflow to a control worker node within a pool of free control worker nodes, the control worker node referring to the embedded workflow description and issuing a job request that defines one or more next operations of the workflow upon the control worker node recognizing that execution of the next one or more operations is appropriate in view of the workflow's state, the next one or more operations including a function call to a service identified by one of the logical identifiers; b) dispatching the job request to an execution worker node within a pool of free execution worker nodes, the execution worker node executing the next one or more operations including mapping the logical identifier of the service to a physical location of the service, incorporating the physical location and the function call into a packet and sending the packet over the network.

45 Claims, 12 Drawing Sheets

(51) Int. Cl.
*G06Q 30/08* (2012.01)
*G06Q 50/40* (2024.01)

(52) U.S. Cl.
CPC .......... *G06F 9/5077* (2013.01); *G06Q 30/08* (2013.01); *G06Q 50/40* (2024.01); *G06F 2209/5011* (2013.01)

(56) References Cited

U.S. PATENT DOCUMENTS

2014/0237442 A1 8/2014 Meda et al.
2019/0278630 A1* 9/2019 Kuroyanagi .......... G06F 9/4881

OTHER PUBLICATIONS

Farinacci, Dino, "The Future of LISP", "All Things LISP" Meeting, ispers.net, Jul. 31, 2013, 15 pages.
Hertoghs, Y., et al., "A Unified LISP Mapping Database for L2 and L3 Network Virtualization Overlays", Networking Virtualization Overlays Working Group, Telecom Paris Tech, Feb. 14, 2014, 26 pages.
Kim, Juhoon, et al., "A Deep Dive into the LISP Cache and What ISPs Should Know about It", Deutsche Telekom Laboratories—Technische Universität Berlin, Ernst-Reuter-Platz 7, 10587 Berlin, Germany, Nov. 6, 2015, 12 pages.
"JSR 208: JavaTM Business Integration (JBI)", JSRs: Java Specification Requests, Java Community Process, Community Development of Java Technology Specifications, https://jcp.org/en/jsr/detail?id=208, Final Release, Aug. 25, 2005, 7 pages.
"LISP Canonical Address Format (LCAF)", Datatracker, RFC 8060, https://datatracker.ietf.org/doc/rfc8060/, Feb. 2017, 28 pages.
"Locator/ID Separation Protocol (LISP) Data-Plane Confidentiality", Datatracker, RFC 8061, https://datatracker.ietf.org/doc/rfc8061/, Feb. 2017, 14 pages.
"Locator/ID Separation Protocol (LISP) Map-Server Interface", Datatracker, RFC 6833, https://datatracker.ietf.org/doc/rfc6833/, Jan. 2013, 11 pages.
"Signal-Free Locator/ID Separation Protocol (LISP) Multicast", Datatracker, RFC 8378, https://datatracker.ietf.org/doc/rfc8378/, May 2018, 17 pages.
"The Locator/ID Separation Protocol (LISP) for Multicast Environments", Datatracker, RFC 6831, https://datatracker.ietf.org/doc/rfc6831/, Jan. 2013, 24 pages.
"The Locator/ID Separation Protocol (LISP)", Datatracker, RFC 6830, https://datatracker.ietf.org/doc/rfc6830/, Jan. 2013, 59 pages.

* cited by examiner

WORKFLOW RUNTIME ENVIRONMENT WITH DISTRIBUTED CONTROL AND NETWORKED SERVICE INVOCATIONS HAVING SEPARATE LOGICAL AND PHYSICAL ENDPOINT IDENTIFIERS

RELATED CASES

This application claims the benefit of U.S. Provisional Application No. 63/086,497, entitled, "WORKFLOW RUNTIME ENVIRONMENT WITH DISTRIUTED CONTROL AND NETWORKED SERVICE INVOCATIONS HAVING SEPARATE LOGICAL AND PHYSICAL ENDPOINT IDENTIFIERS", filed Oct. 1, 2020, which is incorporated by reference in its entirety

FIELD OF INVENTION

The field of invention relates to the computing sciences, generally, and, more specifically to a workflow runtime environment with distributed control and networked service invocations having separate logical and physical endpoint identifiers

BACKGROUND

Large scale corporate and government entities rely on sophisticated business logic processes (also referred to as "processes" or "workflows") to perform various (often mission critical) operations. Traditionally, these processes were executed internally on high performance computers (e.g., application servers) within an entity's own private data center or IS and/or IT infrastructure. With the emergence of cloud computing, however, such entities are increasingly looking to minimize their own IS investment and instead rely on business logic process execution resources that are made available as a service.

FIGURES

A better understanding of the present invention can be obtained from the following detailed description in conjunction with the following drawings, in which.

Figure 5A:
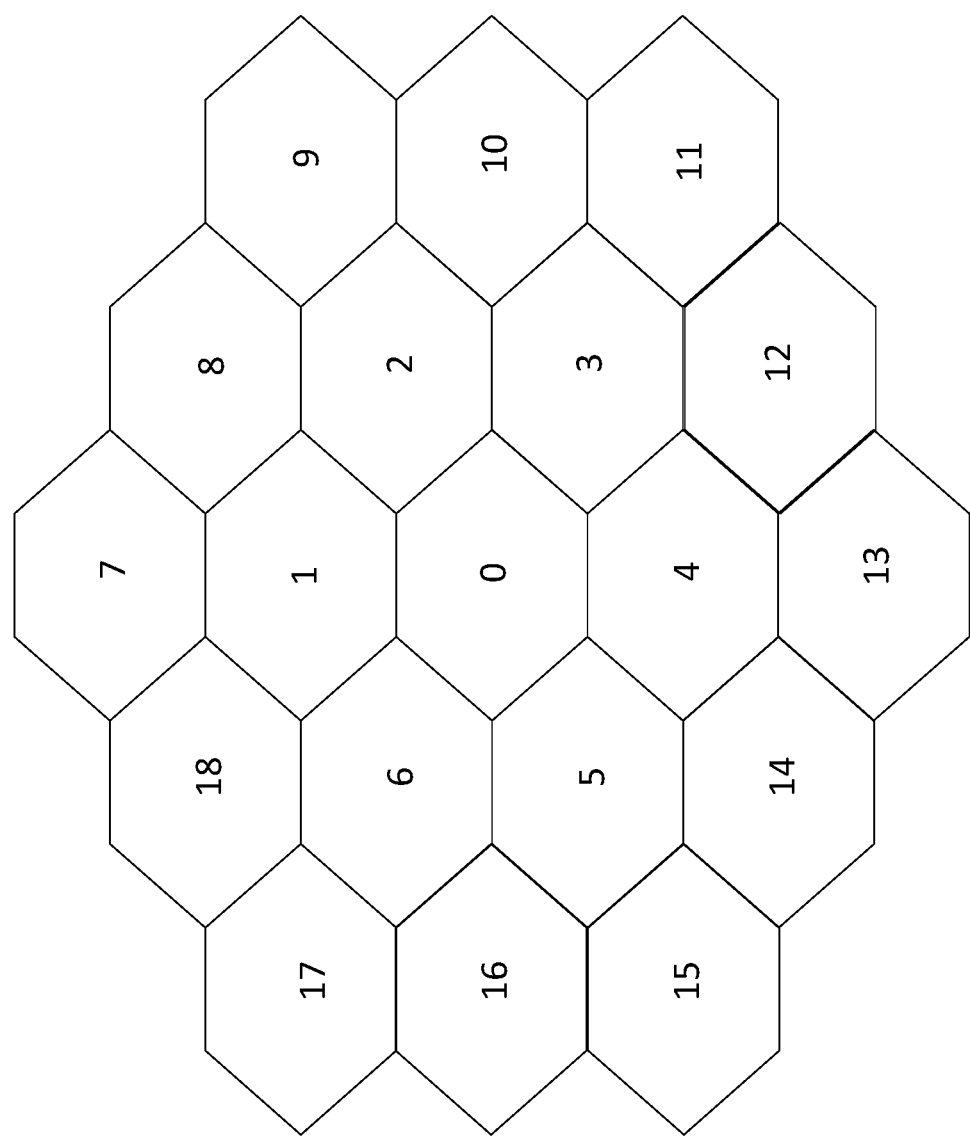
Figure 5B:
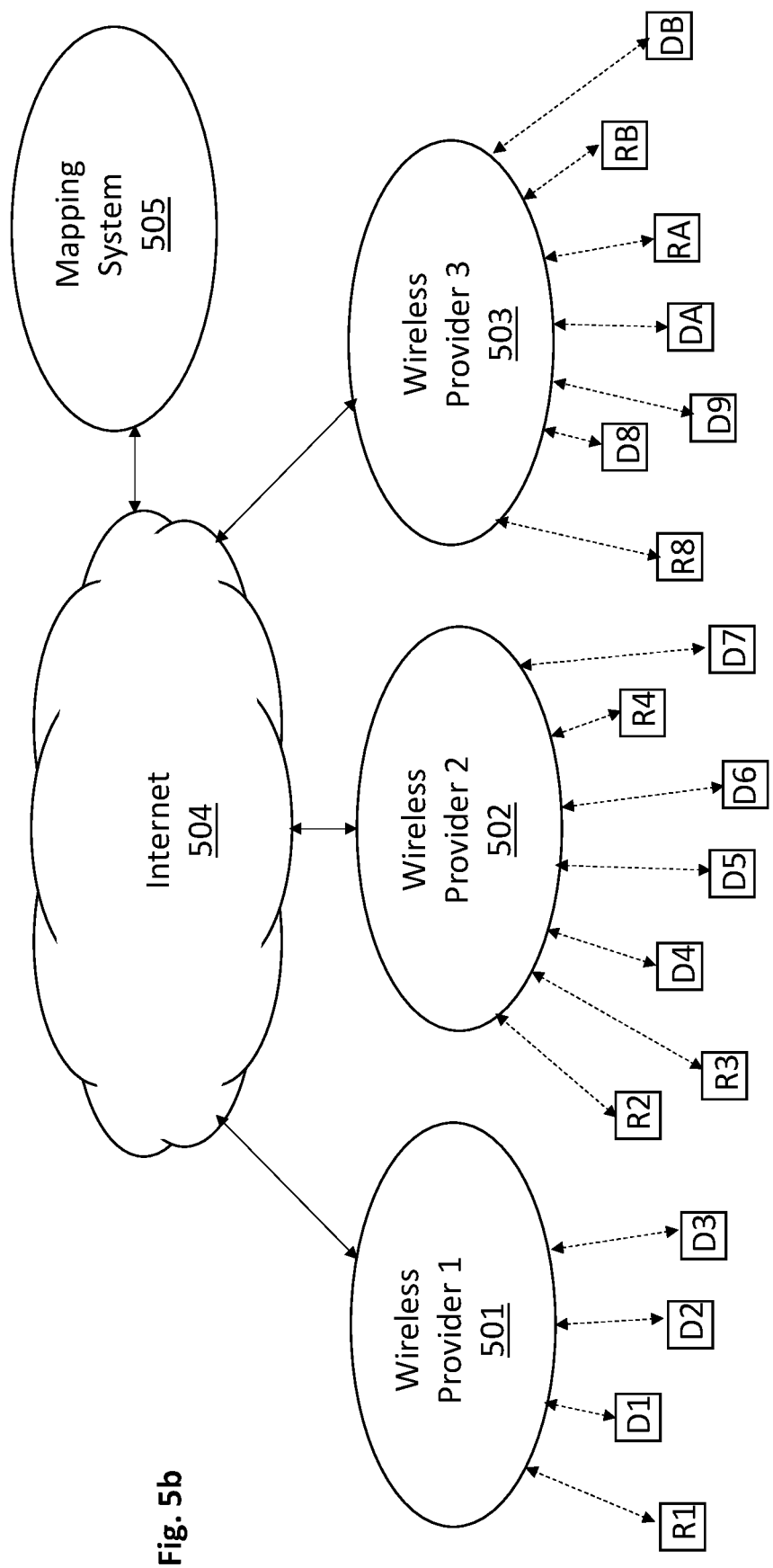
Figure 5C:
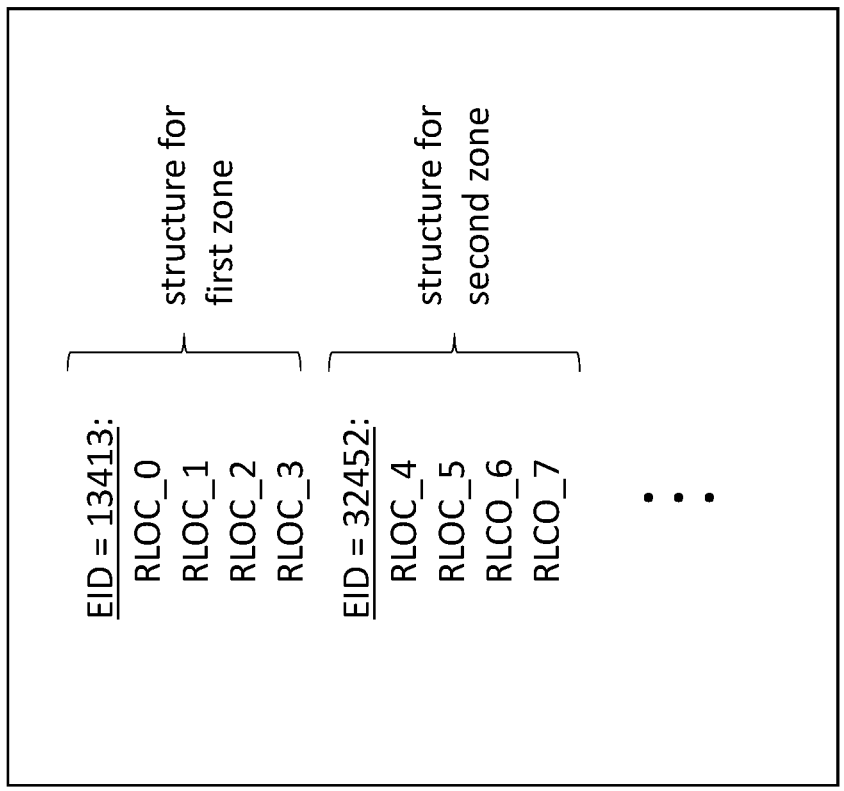
Figure 7:
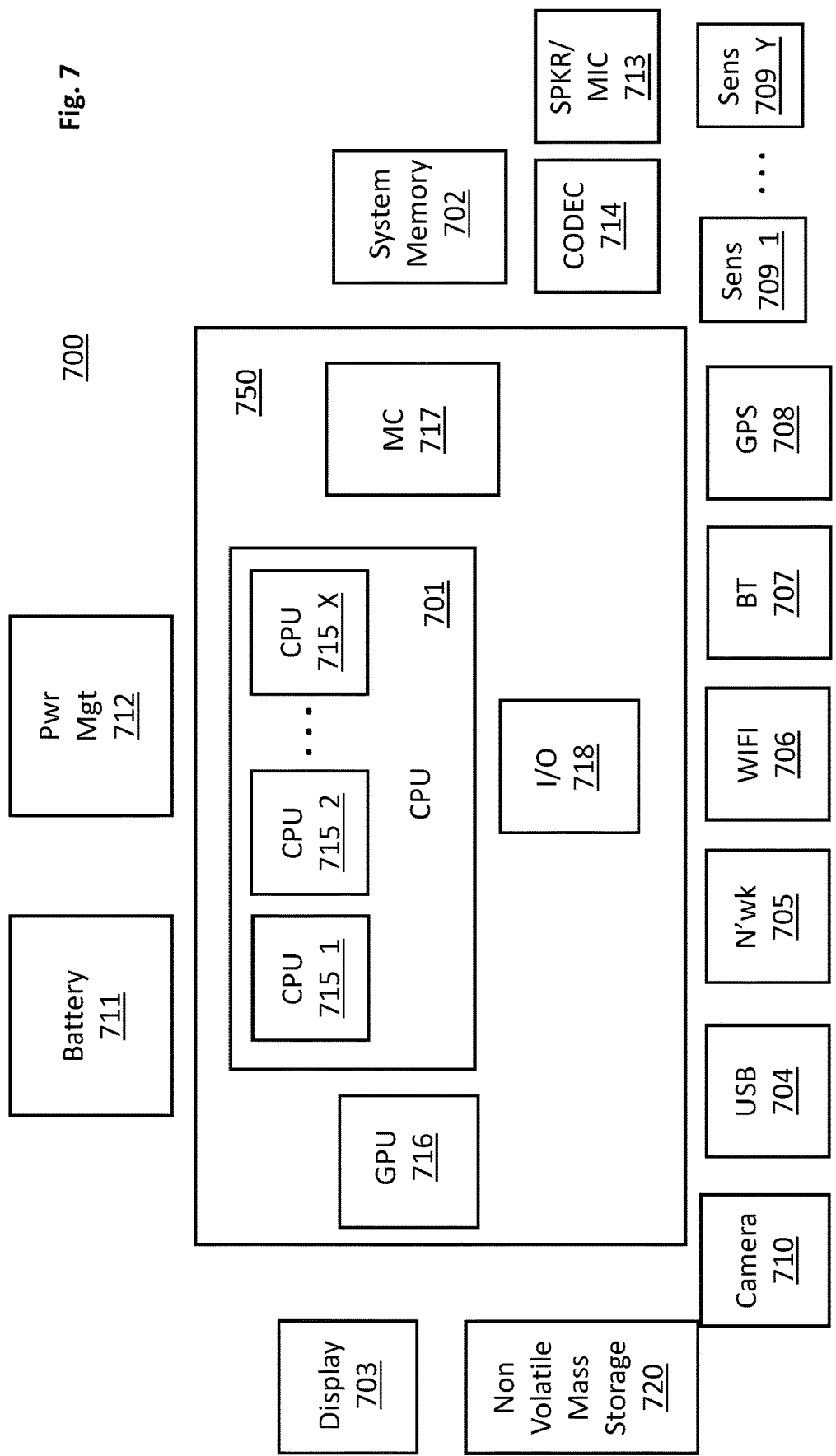

FIGS. 5a, 5b, and 5c depict an embodiment of a workflow;

FIGS. 6a, 6b, 6c, and 6d depict a mobile application;

FIG. 7 shows an exemplary computing system.

DESCRIPTION

Figure 1:
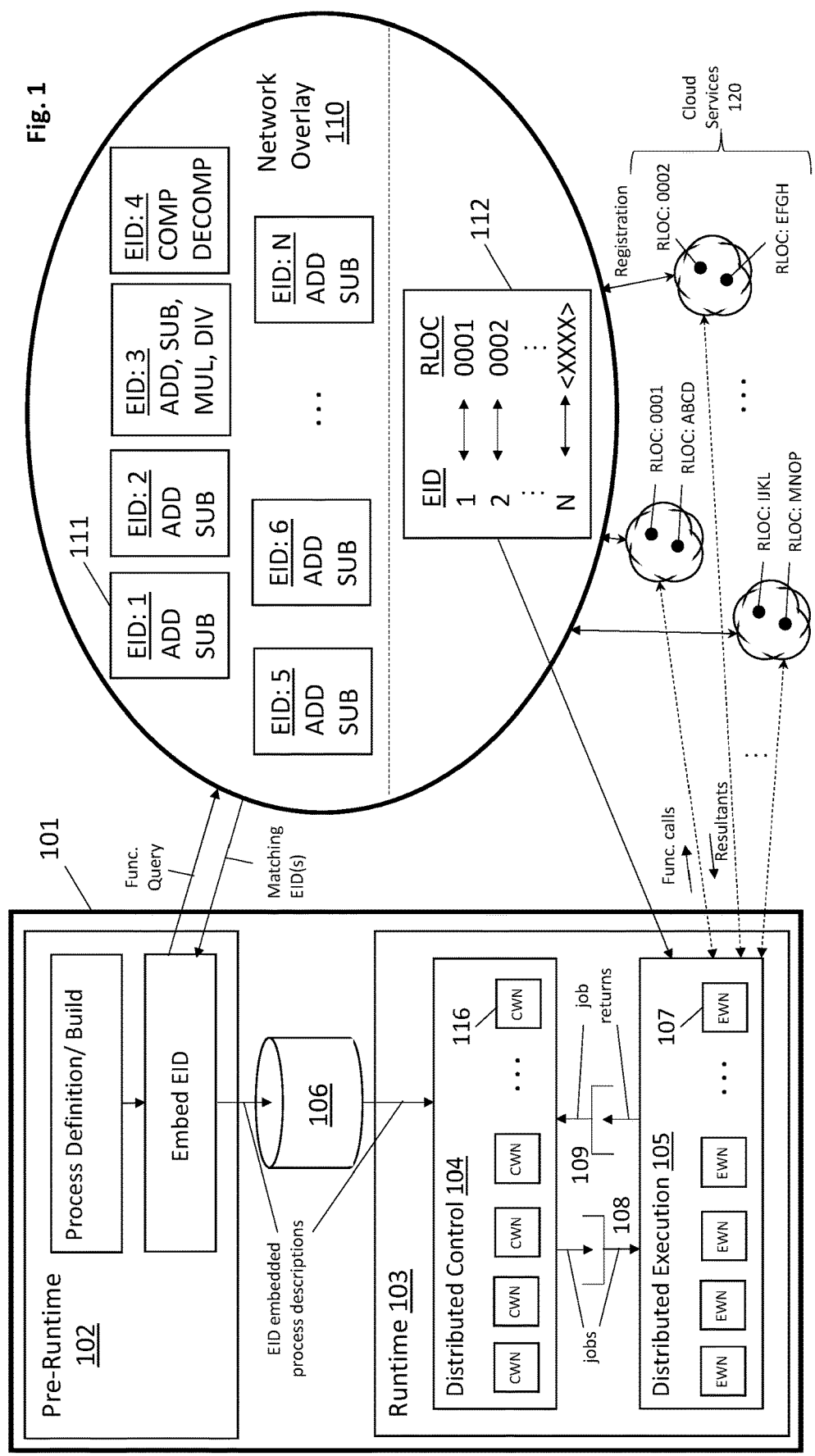
FIG. 1 shows a business logic execution framework.

FIG. 1 shows an improved enterprise business logic execution framework 101 that includes both pre-runtime and runtime components 102, 103. As observed in FIG. 1, the framework 101 utilizes a network overlay 110 and various services 120 that are available over a network ("networked available services" or simply "services", such as cloud services).

As described in more detail below, the runtime component 103 includes a distributed control component 104 to remove/diminish bottlenecks associated with controlling multiple business logic workflows and/or processes in a centralized fashion.

The network overlay 110 (e.g., Location/Identifier Separation Protocol (LISP) as published by the Internet Engineering Task Force LISP Working Group or similar technology) provides two different identifiers for each network service: 1) an identifier, referred to as an endpoint identifier or "EID", is associated with the logical definition of the service (the functions the service performs); and, 2) an address, referred to as a routing locator, "RLOC" is associated with a location/resource that actually performs the service (the RLOC can be a network destination address of a resource that actually performs the service and/or a network waypoint or path or network topological region that is used to reach a physical resource that can perform the service). As will be made clear from the following discussion, separating the service into a logical endpoint identifier (EID) and physical (RLOC) address can promote competition amongst network service providers, support more sophisticated "location based" service offerings among other possibilities.

Figure 2:
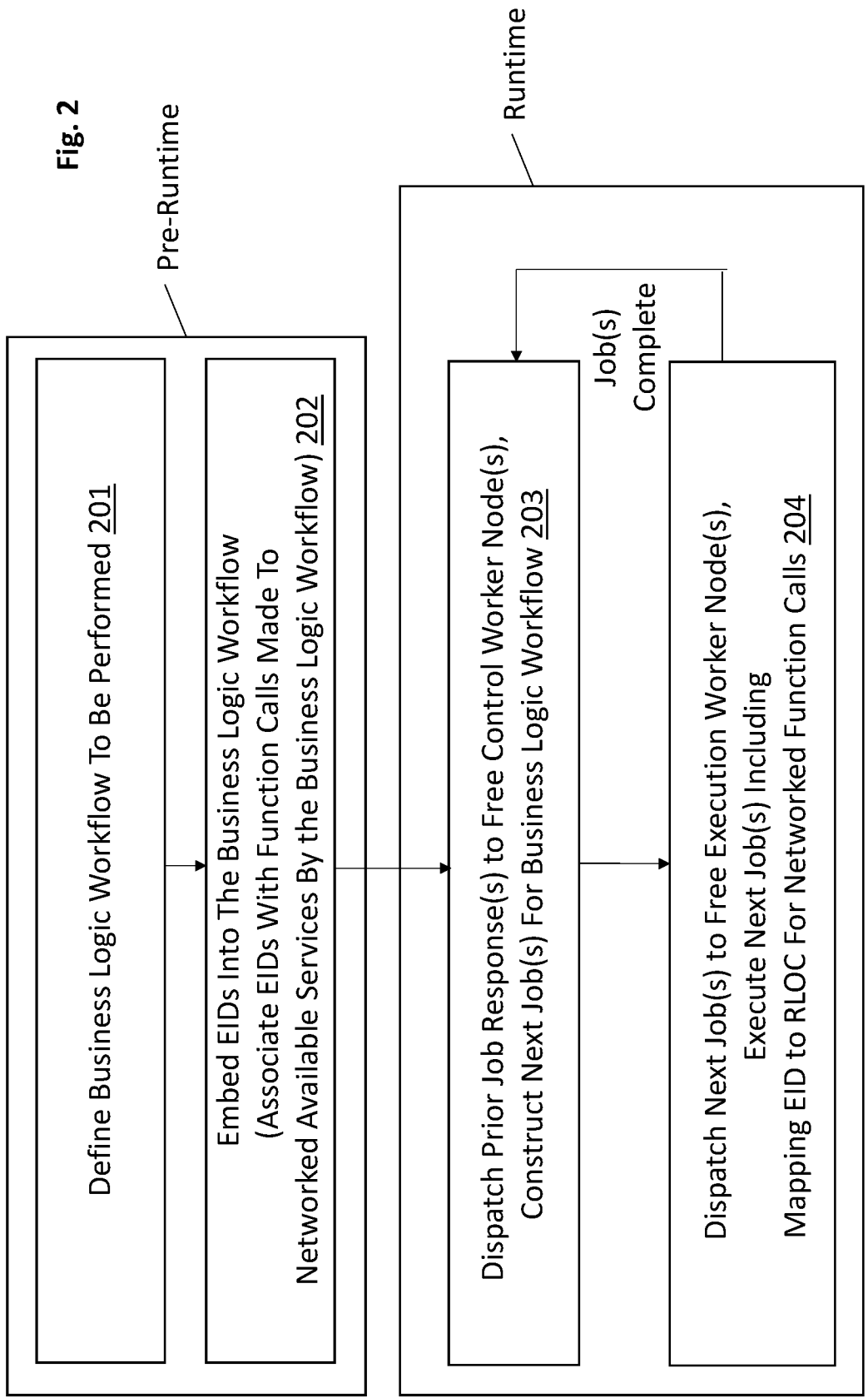
FIG. 2 shows a method that can be executed by the business logic execution framework.

FIG. 2 shows a method of operation of the framework 101 of FIG. 1. Referring to both FIGS. 1 and 2, a user (e.g., an enterprise that seeks to execute business logic workflows on the framework 101) interacts with the pre-runtime component 102 to build the definition of a business logic workflow to be performed 201

Figure 3:
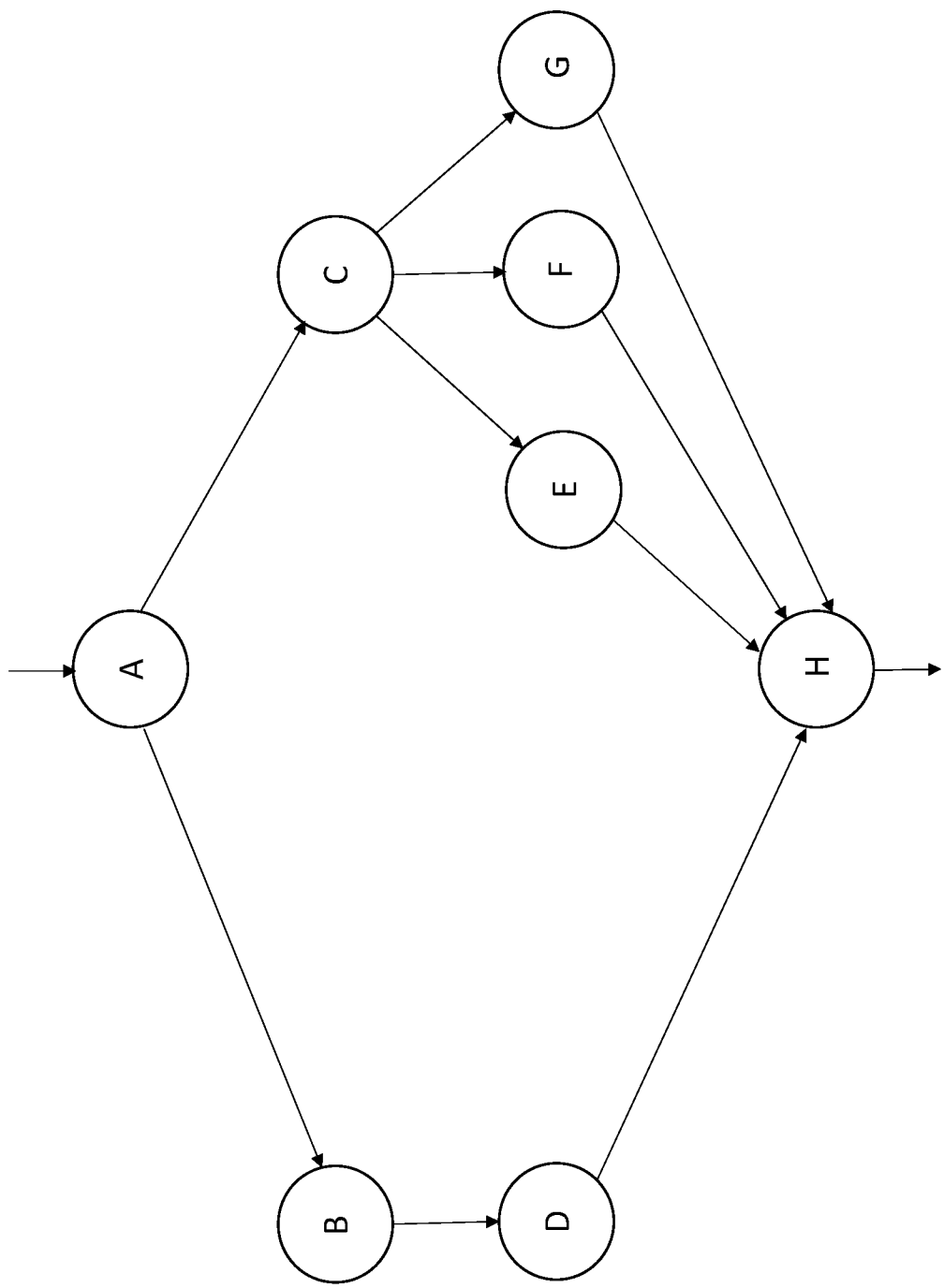
FIG. 3 shows an exemplary directed acyclic graph.

In various embodiments, the structure and/or flow of the business logic workflow can be viewed as a directed acyclic graph (DAG). FIG. 3 shows an exemplary DAG having eight vertices A-H with corresponding edges that define the DAG's overall program flow. Here, each vertex corresponds to a set of one or more operations that, when performed, generate one or more output values for one or more subsequent (e.g., downstream) vertices. In various embodiments, each vertex can be viewed as a basic block of operations that are processed sequentially and/or have some data dependency amongst them, while the edges, e.g., represent a break in strict sequential execution of the DAG's operations (e.g., a decision branch, parallel processing of data sets that have no dependencies, etc.) and/or data dependencies amongst operations.

As will be made more clear in the following discussion, the one or more operations of each vertex are typically executed by invoking one or more networked function calls. Here, each function call typically specifies one or more opcodes (function(s) to be performed) and one or more data values and/or addresses (local or networked) of data value(s) that the opcode(s) are to operate on. In a common scenario, the function call conforms to the syntax of an Application Programming Interface (API) of the networked service and/or application software program that is being reached through networked service.

A function call can specify any of a wide spectrum of operations from, e.g., large scale batch and/or otherwise computationally intense processes (e.g., find-all-entries (in a database), find-partial-match (in a database), etc.) to, e.g., micro-service operations (e.g., add (ADD), subtract (SUB), multiply (MUL), read-file, write-file, append-file, etc.

The resource of a networked service that is to actually receive and execute a function call can be referred to as an "endpoint". Endpoints can be defined at various degrees of granularity including but not limited to: an instance of a specific application software program running on a specific server, a specific virtual machine running on a specific hypervisor on a specific server, a specific CPU of a specific server, a specific database, etc.

As observed in FIG. 1, there are a number of different networked service "clouds" each having multiple endpoints that are available to the framework 101. For simplicity each networked service is depicted as having only two endpoints (there are two network destinations within each cloud service that can physically receive and execute a function call). It is pertinent to point out that it is possible, in fact expected (particularly for large scale service providers), that more than two endpoints reside within any/all service clouds. The service clouds can also be publicly available service clouds (e.g., where function calls are made over a public network such as the Internet), private service clouds (e.g., are private to the user over the user's own private network), or a combination of public and private service clouds.

The set of functions that can be executed by each endpoint are specific to each endpoint. Although it is possible that the set of functions can be identical across all endpoints, or entirely unique/different across all endpoints, it is expected that the available set of service clouds will typically include a mixture of: 1) endpoints having uniquely different sets of supported functions; 2) endpoints having identical sets of supported functions; 3) endpoints having a mixture of identical and uniquely different supported functions.

The network overlay 110 uniquely identifies each endpoint with an EID. Associated with each EID is the set of function calls that the corresponding endpoint can execute. FIG. 1 depicts (simplistic) sets of functions that are supported/available by/at various ones of the service clouds' respective endpoints. As can be seen in FIG. 1: 1) the endpoint having EID=1 ("EID_1") supports the basic add and subtract math functions ADD and SUB; 2) the endpoint having EID=2 ("EID_2") supports the same set of functions as endpoint EID_1; 3) the endpoint having EID=3 ("EID_3") supports the same basic math functions as endpoints EID_1 and EID_2 but also includes additional multiply and divide functions MUL and DIV; 4) the endpoint having EID=4 ("EID_4") provides compression and decompression functions COMP, DECOMP; 5) the endpoint having EID=5 ("EID_5") provides encryption and decryption functions ENCR, DECR, etc. Again, it is pertinent to point out that typical service clouds will commonly support not only more functions but also more sophisticated functions.

As mentioned above, the set of EIDs maintained by the platform reflects the endpoints of more than one service cloud. Thus, for instance, a first groups of endpoints may correspond to interfaces/APIs offered by a first commercial cloud service provider (e.g., Amazon AWS), a second group of endpoints may correspond to cloud interfaces/APIs offered by a second commercial cloud provider (e.g., Google Cloud), other sets of endpoints may correspond to any/all of a multitude of other commercially available cloud services, and, even more sets of endpoints may correspond to non-public or proprietary endpoints that, e.g., are available to the user's workflow through the user's one private intra-net IS infrastructure.

Importantly, each endpoint is identified not only by a logical identifier (EID) as discussed above but also a physical location address (RLOC). Traditionally, endpoints have been identified by an identifier (e.g., a TCP/IP address) that not only uniquely identifies the existence of the endpoint but also defines of the physical location of the endpoint (e.g., a particular application software program executing on a particular virtual machine (VM) executing on a particular central processing unit (CPU) within a particular server computer).

As will be described in more detail below, the separation of the networking address information into a logical endpoint identifier and a physical location address provides both the business logic workflows that execute on the framework 101 and the providers of the service clouds 120 significant performance, flexibility, economy, security and/or reliability opportunities. Specifically, assigning an EID to each endpoint allows for easy, fair, competitive and/or customized use of the cloud service(s).

For instance, referring back to FIG. 2, after a description of a business logic process workflow has been constructed 201, the description of the workflow is compiled and/or deployed. In an embodiment, as part of the compilation/deployment, each networked function call made by the workflow 202 is assigned an EID.

That is, for instance, if the workflow needs to call a networked "ADD" function, during compilation/deployment of the workflow, e.g., for deployment of the workflow, a query for the ADD function is submitted to the network overlay 110. A search engine within the network overlay 110 (not shown in FIG. 1 for illustrative ease), returns the EIDs of (e.g., all) endpoints that can perform that function.

In the particular example of a networked ADD function call, referring to FIG. 1, the search engine will return the EIDs of the endpoints that support the ADD function (specifically, endpoints EID=1, 2, 3, 5, 6 and N at least). With the identities of the available endpoints that can perform the function being identified, the compiler/deployment process chooses one of these EIDs and then embeds it in the description of the workflow in a manner that associates it with the particular ADD function that the query was submitted on behalf of. For example, if the particular ADD function is a particular ADD operation in a particular vertex of a DAG, the compiler "updates" the definition of the ADD operation within the particular vertex of the DAG within the workflow description with the chosen EID.

In an embodiment, each networked function call within the workflow description is processed in this fashion by the compiler/deployment tool such that each networked function call with the workflow description is assigned a particular EID. Note that a set of, e.g., sequential functions may be grouped together in a single query to identify the EIDs of endpoints that can perform all of the functions defined in the query in response to a single function all (e.g., a single network invocation can request a "batch" of operations to be performed). For example, if a sequence of operations in a particular vertex of a DAG includes ADD, SUB, MUL and DIV functions, the compiler/deployment tool could send a query that listed each of these functions in a single query. The network overlay's search engine would return the EID of endpoint EID_3 because endpoint EID_3 can execute all of these functions (the EIDs of any other endpoints that can also perform all of these functions, if they existed, would also be returned).

Assuming endpoint EID_3 is chosen for execution of all these functions, the description of the workflow's DAG would be modified to associate the EID of endpoint EID_3 with each of the functions. Thus, the compiler/deployment tool is free to "batch" functions as it prefers and/or in light of guidelines provided by the platform. To the extent non-sequential (e.g., parallel, independent, asynchronous) functions can operate concurrently (such as the functions of two data independent vertices), the compiler/deployment tool can intelligently select different EIDs for vertexes/function(s) that can concurrently execute so that, e.g., function calls to these different EIDs can be simultaneously/concurrently issued.

Note that in various embodiments various forms of meta-data may be appended to any EIDs that are returned from a network overlay query that the compiler/deployment tool uses to guide its selection of a particular EID for the execution of the function(s) that the query was submitted on behalf of. For example, such meta-data may include a cost structure such as the amount of money or the monetary rate at which the invoking user will pay for invoking of the function(s) of the endpoint identified by the EID. Such cost structures may be, to name a few, cost per unit of time, fixed cost per function call. Combined or alternative cost structures can also include latency of service, performance, etc.

Here, a single endpoint or cloud service provider may offer different monetary rates for different levels of performance for a particular function. For example, the meta data that is returned for a particular EID may provide two different monetary rates for two different ADD functions, ADD and ADD*. Both ADD and ADD* meet the definition of the ADD function that was queried for. However, the ADD* function will execute in less time than the ADD function (e.g., because the service provider that offers the endpoint subscribes less offered load to the ADD* function than the ADD function and/or provides more hardware resources to the ADD* function than the ADD function). For the heightened performance, the user will be charged more for execution of the ADD* function than the ADD function.

In another approach, a cloud service provider registers a first endpoint with the network overlay 110 for a "nominal" set of offered functions, including ADD, having nominal propagation delay. The same cloud service provider also registers a second endpoint with the platform for the (logically) same set of offered functions, also including ADD, having significantly less propagation delay than the first endpoint. The EIDs for both endpoints and their meta data will be returned for a search query that includes the ADD function. The meta data of the EID for the first endpoint will reflect a lower cost usage rate (e.g. per call, per amount of execution time, etc.) than the meta-data that is associated with the returned EID for the second endpoint.

In practice, as described in more detail further below, the cloud servicer provider may effect such offered terms of service by mapping the EID of the first end-point to the physical location (RLOC) of a first virtual machine that is subscribe-able to more customers than a second virtual machine whose RLOC is mapped to the second EID. Alternatively or in combination, the second virtual machine may be allocated more physical resources (e.g., higher performing CPU, more memory allocation) than the first virtual machine.

In essence, the service provider configures different end-points with different Quality-of-Service (QoS) and assigns different EIDs to these different end-points. These same end-points can then meet the same search criteria, and, as such, their respective EIDs with associated meta-data (reflecting different performance and cost rates) is returned for the same search query. The compilation/deployment tool can then choose which EID (nominal or high performance) is appropriate for a particular function (or set of functions that have been queried for).

For example, if the particular function or set of functions that were queried for is/are deemed to be a particular, potential bottleneck in the execution of the overall workflow, the compilation/deployment tool may opt to choose the more expensive, higher performance EID. By contrast, if the particular function or set of functions that were queried for is/are deemed to be a less important part of the execution of the overall workflow (e.g., because it will not behave as a bottleneck or otherwise), the compilation/deployment tool may opt to choose the less expensive, lower performance EID.

Additionally, note that the above example focused upon the endpoints offered by a same service provider. The same process can also apply to endpoints and corresponding EIDs (and the respective meta-data) returned from multiple, competing service providers. Here, consider a second service provider who competes with the service provider discussed above whose endpoints EIDs are also returned with the same search query described above. Assuming a range of performance and price options across the returned offering from both service providers, the compiler/deployment tool will be able to choose the particular performance/price option that comes closest to the optimal choice as best as the compiler/deployment tool can discern the tradeoffs. Note that competition between service providers on a function call by function call basis is possible at least when the syntax of a function call is identical amongst the providers.

Thus, the network overlay 110 cultivates not only sheer price competition (providers of services of same performance will be motivated to provide that performance at cheaper cost) but also granularity or spectrum of price as a function of performance (a wide range of different performance-price options can be made available).

Apart from pricing related meta-data that is returned with any EID, in same or alternative embodiments, physical endpoint regional location can also be returned as meta-data with any EID. For example, consider a user who is concerned about security risks associated with endpoints, at least for certain functions, that are physically implemented outside the domicile/sovereign state/nation of the user. As such, the returned meta-data for any EID can also define a guarantee as which domicile(s)/sovereign state(s)/nation(s) (or more generally, geographic location(s)) where the endpoint for that EID will be physically located.

In cases, for example, where the function(s) that were queried for are sensitive to security lapses (e.g., private, military or otherwise), if the returned meta-data for an EID guarantees that the corresponding endpoint will be located in a specified geographic region, the compiler/deployment tool can, for instance, immediately eliminate, from any returned query, those EID instances whose geographic region the user is not comfortable with. The selection process then reduces to those EIDs whose endpoints that are within a comfortable geographic region and that best match the user's desired price-performance.

Another realm where geographic location can impact a more optimal solution is, e.g., wireless services and/or real-time services (e.g., video conferencing) where, network propagation delay can affect the business logic's performance. At one extreme, the user/compiler/deployment tool understands that certain geographical locations will enhance (or likewise diminish) workflow performance. At another extreme, knowing that workflow performance will depend on geographic location of the endpoint, the query submitted to the network overlay 110 by the compiler/deployment tool includes a parameter that identifies the preferred geographic location, or, at least, identifies that the function(s) is/are geographically sensitive.

In response, EIDs (and/or EID meta data) will be returned whose endpoints are guaranteed by the service to be within a particular geographic region, and/or, that guarantee networked "re-location" to (perhaps a deeper, hidden) endpoint that is in the geographic location specified/preferred by the search query. For example, a service provider may offer a generic endpoint (and associated EID) that is guaranteed to route geographically sensitive function calls to another endpoint that is physically located in proximity to the function that is making the call (the syntax of the function call may include area code, GPS or other geographic identifying information).

In cases where there is no meaningful difference between available EIDs that meet the query requirements of a particular query (e.g., a pool of physically different but functionally identical endpoints are available for consideration) the compilation/deployment may select a particular EID based on a round-robin scheme, e.g., to load balance across endpoints.

After the compiler/deployment tool has embedded a business logic workflow's function calls with the EIDs of the endpoints that will execute the workflow's networked function calls, a description of the EID configured workflow is stored in a runtime database 106. As initially loaded, the description of the workflow can include meta data that indicates that the workflow is not currently executing or that its current state is at the very beginning of the workflow. Importantly, the runtime database 106 includes descriptions of the other EID configured business logic workflows that are currently being executed by the framework 101 and are at various respective points of operation. The runtime database 106 can be a centralized or distributed storage entity depending on implementation (e.g., private or public cloud storage service, blockchain storage system, etc.).

As observed in FIG. 1, the runtime framework 103 includes a distributed execution component 105 and a distributed control component 104. The structure of the distributed execution component 105 is, in various embodiments, akin to current state-of-the-art data centers in which multiple "worker nodes" 107 are pooled and incoming processes are dispatched to free worker nodes on an as-needed basis (for ease of drawing FIG. 1 labels only one of the worker nodes). In various embodiments, the distributed execution component 105 is composed of one or more high performance data centers each having one or more high performance computers (e.g., server computers). Such computers may be located "deep" within a network infrastructure, and/or, at or near the edge of a network infrastructure (such as appended to a local cellular wireless service provider's infrastructure), and/or at network nodes in between a deep central point and an edge. The servers each contain one or more CPU processors and each CPU processor includes one or more processing cores.

Each processing core can concurrently execute a plurality of threads, where, a thread is the sequential program code of a particular instance of software. With this particular arrangement, the data center is composed of hundreds, thousands (or more) of concurrently executing threads. In various embodiments, each thread corresponds to a worker node. In other embodiments, each thread supports the execution of one or more virtual machines (e.g., that run on a virtual machine monitor or hypervisor) and each virtual machine corresponds to a worker node. In either arrangement, a worker node can execute the low level executable code (machine instructions) of a particular instance of software.

Smaller sub-processes of the larger workflows ("jobs" or "processes") are then dispatched to worker nodes on an as needed basis 204. Here, the execution component 104 oversees a pool of free or idling worker nodes and pulls jobs from an input request queue 108. Each job that is pulled from the queue 108 is dispatched to one of the free worker nodes in the pool for execution (for ease of drawing, a dispatching function is not depicted in the execution component 105 of FIG. 1). After the worker node completes the job, the result is placed in a response queue 109 and the worker node that executed the job is deemed to be returned to the free pool. As such, the worker node is free to be assigned to another job including a job for a different business logic workflow that is currently being executed by the framework 101.

As will be described in more detail further below, each job is entered into the request queue 108 by the distributed control component 104 and includes one or more commands or instructions of a particular business logic workflow whose description resides in the runtime database 106 and that is currently being executed by the framework 101. For example, the job may include some or all of the commands/instructions associated with a vertex of a DAG. These one or more commands/instructions can include a function call to a specific endpoint identified by an EID that was embedded into the DAG's workflow description by the compilation/deployment process.

Upon execution of the function call by the worker node that the call's job has been dispatched to, the EID of the functional call is translated into the target endpoint's RLOC, which, in turn, is embedded into the (destination) header information of a packet that includes the function call. The packet is then sent into a network that couples the framework 101 to the service provider that includes the endpoint. As observed in FIG. 1, the network overlay 110 also includes a mapping 112 of EID to RLOC for, e.g., every EID that is registered with the network overlay 110. Each worker node includes or has access to a local instance of the map for quick look-up during outbound packet formation. While the packet is in flight the worker node waits for a response.

The packet is directed over the network to the correct endpoint based on the RLOC information in the packet header. Upon receipt of the packet (or at least the function call) by the endpoint, the endpoint processes the function call resulting in the generation of a response. The response is then incorporated into a response packet that is sent over the network to the worker node. Upon receipt of the response, the worker node may proceed to execute any subsequent instructions in the job (e.g., that use the result as input data) that included the function call. Such subsequent instructions may or may not include one or more remote functional call(s) to the same or other cloud service.

Here, note that the worker node (e.g., being a thread executing on underlying CPU hardware) can execute various instructions of the job locally that do not include or need any function call. Thus, for instance, a job may include a number of commands/instructions some of which invoke remote function calls to cloud services that are registered with the network overlay 110 while others of which are directly executed by the worker node.

Commands/instructions that are locally executed by the worker node may precede or follow any remote function call that is included in the job.

When the job completes one or more resultants of the job are generated by the worker node. A completion message is created that includes the resultant(s). The completion message is entered into the output queue 109 and the worker node is deemed entered into free pool.

Thus, over an extended period of runtime, job messages are regularly entered into the request queue 108 by the control execution component 104 and dispatched to free worker nodes within the execution component 105 which concurrently execute them. As the jobs complete, their corresponding response messages are entered into the response queue 109 and the corresponding worker nodes are returned to the free pool for dispatch to jobs that were subsequently entered into the request queue 108. Again, a sequence of jobs that are assigned to a same worker over time node may be associated with different business logic workflows that reside in the runtime database.

The distributed control component 104 pulls response messages from the response queue 109, and, generates a next set of jobs for the corresponding workflows based on each workflow's state and/or operating point 203. For example, if the condition for starting a next job for a particular business logic workflow is the completion of the job that the distributed control component 104 just pulled from the response queue 109, the distributed control component 104 is free to create the next job for the business logic workflow. By contrast, if the condition for starting a next job for the business logic workflow is the completion of multiple jobs of the workflow—some of which are still in flight (are being executed by the execution component 105), the distributed control component 104 will delay creation of the next job for the workflow until all the jobs that creation of the next job is dependent upon on have completed.

In various embodiments the distributed control component 104 is also implemented with one or more high performance computers within one or more data centers as described above with respect to the distributed execution component 105 and dispatches completed job messages to free control worker nodes on as needed basis. Again, such computers may be located "deep" within a network infrastructure, and/or, at or near the edge of a network infrastructure (such as appended to a local cellular wireless service provider's infrastructure), and/or at network nodes in between a deep central point and an edge. For ease of drawing FIG. 1 labels only one control worker node 116.

Whereas the execution worker nodes of the distributed execution component 105 execute the substantive logic of the workflows being executed by the framework 101, by contrast, the control worker nodes of the distributed control component 104 are used to navigate through the structure and flow of these workflows so as to define/recognize/understand any/all of: 1) where the workflow's operating point currently resides (e.g., what vertex or edge is a DAG currently at); 2) operations of the workflow that must run in sequence (e.g., because they are data dependent); 3) operations of the workflow that can run currently, in-parallel or are otherwise independent of each other (e.g., because they have no data dependencies); 4) the required state of the business logic workflow prior to commencement of a next flow of the workflow's operations, etc.

In an embodiment, the distributed control component 104 includes a free pool of worker nodes. When a response message for a workflow's previously executed job is entered into the response queue 109, control of the workflow is dispatched to a control worker node 116 (if the workflow does not already have a control worker node dispatched to it) within the distributed control component 104. Upon being dispatched to the workflow, the control worker node 116 fetches the description of the workflow from the runtime database 106 and analyzes it. In an embodiment, the fetched workflow description includes a pointer that was left by the previous control worker node to operate on the workflow description and identifies where the operating point of the workflow is (or was).

In an embodiment, the pointer information includes or is otherwise associated with additional information that identifies the operation(s) of and/or the job(s) that were in-flight when the previous control worker node to operate on the workflow completed its operation (e.g., by submission of these same job(s) to the request queue 108). In further embodiments the previous control worker node also embedded information into the description of the workflow that identifies what state the workflow must reach before a next one or more jobs are permitted to be defined/constructed and submitted to the request queue 108.

The control worker node 116 that currently has been dispatched to the workflow studies the information left by the previous worker node and "listens" to the response queue 109 for the required next state condition to be met. Here, depending on implementation, the control worker node 116 determines the required next state because the prior worker node did not leave any information in the workflow description defining it, or, simply refers to the required next state as determined by the prior worker node and was embedded in the workflow description.

Here, again, depending on the specific structure of the workflow and its current point of operation, it may have one or more jobs in flight. If there is only one job in flight the condition for creating a next job (or job(s)) is apt to be completion of the in flight job (unless some external input is also required). If there are multiple jobs in flight, the condition for creating a next job (or job(s)) may be completion of one or more of the in-flight jobs. Regardless, once the condition for creation of a next one or more jobs is known, the control worker node 116 that has been dispatched to the workflow actively listens to the response queue 109 so that it can recognize when the condition has been met.

Once the control worker node 116 observes the required condition has been met (receipt of the required one or more job completion messages in the response queue 109) the control worker node 116 proceeds to create the next one or more job message(s). Often, an appropriate next job is determined from information contained in a just received job response message (or messages). For example, in the case of a branch decision, which branch the workflow is to next proceed along is determined by one or more resultant(s) that were included in the received one or more job completion messages that the advancement of the workflow was deemed to be dependent upon.

With the next advancement being determined, the control worker node 116 analyzes the description of the workflow that was read from the runtime database 106 and defines the next job or jobs that are to be submitted to the request queue 108 for execution by the execution component 105. Again, in cases of, e.g., strict data dependency, only one job message may be submitted to the request queue 108 (the workflow can advance through only one sequence of operations contained in the next job message), or, in cases of, e.g., no data dependencies, multiple job messages may be created and submitted to the request queue 108 (the workflow is free to execute as many data independent blocks of sequential operations as it can). In the case of the latter, one job message is created for each block of sequential operations that do not have any dependencies on the other job messages being created.

In various embodiments, in determining the appropriate sequence of operations for the workflow once the condition for its advancement has been reached, the control worker node 116 can refer to static "hints" that were embedded in the original workflow description by the compilation/deployment process. Here, for instance, as part of the pre-runtime compilation/deployment of a workflow, a determination is made as to which blocks of operations are to be included in a same job. In this case, when defining or constructing the respective instruction content of the workflow's next appropriate job(s), the control worker node 116 simply refers to the markers or hints left by the compiler that define the boundaries between jobs.

Alternatively, as described above, the worker node 116 can dynamically analyze the description of the workflow to determine any/all of the operational boundaries between jobs.

Commensurate with the creation of the appropriate number and corresponding operational content of the job messages for the workflow's current state and the entry of the same into the request queue 108, the control worker node 116 then updates the description of the workflow to reflect the current state of the workflow. Such information can contain a description of the jobs that are currently in-flight (which at least includes the job(s) that the worker node 116 just created and submitted to the request queue 108). The information can further contain the required next state of the workflow that must be reached before a next job can be created. After the submission of the next job(s) to the request queue 108 and the submission of the updated workflow description to the runtime database 106, the control worker node 116 is deemed to have completed its task and is returned to the free pool of control worker nodes.

Importantly, as with the execution component 105, a same control worker node can navigate portions of different workflows over an extended runtime, and, likewise, a particular workflow can have its control navigated by multiple, different control worker nodes over an extended period of its runtime.

In various embodiments, the EID configured workflow description that is created by the pre-runtime environment 102 and stored in the runtime database 106 is formatted only to some higher level intermediate code (e.g., to reduce the footprint size of the workflow description). Subsequently, the worker nodes of either or both of the control and distribution components 104, 105 further compile the workflow's higher level intermediate code into lower level code that can be executed by the CPU processors of the execution component 105 or low level translators/virtual machines/just-in-time compilers that execute on them.

For example, according to a first approach, as part of the creation of a particular job by a particular control worker node, the control worker node compiles the higher level operations from the workflow description into, e.g., low level machine agnostic code (e.g., bytecode, code to be translated by a translator, code to be compiled by a just-in-time compiler, etc.). The low level machine agnostic code is physically included in the job that is forwarded to the execution engine via the request queue 108. The execution worker node of the execution component 105 that is dispatched to the job then compiles the low level machine agnostic code into the object code of the specific CPU processor that executes the job.

According to another approach the control worker node compiles the higher level operations into CPU specific object code that CPU(s) of the execution component 105 can directly execute. According to another approach the control worker node does not perform any compilation and the execution engine (e.g., the worker node that is dispatched to the job) performs the full compilation from the workflow description's higher level intermediate code (which is specified in the received job) to the object code of the CPU processor that executes the job.

According to yet another approach the compilation/deployment process fully compiles the workflow description to an object code level or byte code level and stores the workflow description in the runtime database 106 as low level coding.

As described above, apart from keeping a registry of EIDs and their corresponding functions, the network overlay 110 also keeps a mapping 112 of EID to RLOC for each registered EID. Here, if a service provider chooses to change a mapping entry for one of its EIDs (e.g., the service provided wants to assign a different RLOC to the EID) the service provider can notify the network overlay 110 which executes a mapping change algorithm with the execution component 105 (described in more detail below). Alternatively, the service provider can keep the RLOC as registered with the network overlay 110 and then transparently direct traffic that is directed to that RLOC within in its own private network to one or more different physical location(s) than where previous function calls that were directed to that RLOC were sent.

For instance, prior to the RLOC change, the service provider may have directed all function calls that targeted that RLOC to a first virtual machine. Then, to actually effect the RLOC change, the service provider directs all subsequent function calls that target that RLOC to one or more different virtual machines.

Thus, physical resource implementation changes made by service providers can be "open" and are reflected in the network overlay's EID to RLOC mapping 112, or, can be hidden and are not reflected in the EID to RLOC mapping 112. In the case of the former (open), the service provider notifies the network overlay 110 of the new RLOC for the particular EID.

The network overlay 110 then notifies the execution component 105, which, in turn, notifies all worker nodes or at least all local (cached) EID to RLOC mappings that all worker nodes have access to. The execution component 110 and the corresponding worker nodes then update their mapping tables, suspend any threads that include a function call to the RLOC that is being switched out and notify the network overlay 110 that they have received the notice to change the RLOC for the EID and have implemented the change. Once the network overlay receives such confirmation from, e.g., all execution component(s) such that the overlay 110 can confirm that all worker nodes have access to an updated mapping table with the new RLOC, the network overlay 110 communicates to all execution component(s) that they are free to suspend their threads and begin executing function calls that reference the EID with the new RLOC.

In some embodiments, there may be more than one RLOC assigned to an EID in the mapping 112 itself (e.g., a single EID has RLOCs 0003 and 0004 assigned to it in the mapping table 112 of FIG. 1). In such embodiments, a worker node is free to choose any of the listed RLOCs for a particular EID when dispatching a function call for that EID. In some cases a policy may be used to determine which of multiple available RLOCs a worker node is to select for a particular EID. For instance a first policy may be round-robin to equally balance function calls across the multiple RLOCs. In other embodiments weighting information may be embedded in the mapping to impose some imbalance amongst the RLOC options (e.g., a first RLOC with weight 0.75 will be chosen three times for every time an RLOC with weight 0.25 is chosen). In further embodiments the weighting information may be dynamically changed in light of changing conditions such as cost (a cheaper RLOC is dynamically assigned a higher weight than a more expensive RLOC for the same EID service). In still yet other embodiments it is conceivable that more than one RLOC are concurrently invoked/called for a single EID functional call, e.g., to effect parallel processing of the function call.

RLOCs can also dynamically change for a particular EID depending on the current state of the device that is executing the process in which the EID is embedded. For example, multiple RLOCs may be assigned to a particular EID during compilation where each RLOC is associated with a different geographic region (e.g., a different metropolitan area). If the process that includes the embedded EID is a mobile device whose physical location can change, the RLOC that is chosen for the EID is based on proximity to the device. That is, each RLOC in the mapping includes meta data that indicates the RLOC's location and the process selects the RLOC for the EID whose proximity is closest to the mobile device as compared to the other potential RLOCs that are listed in the mapping for the EID. Alternatively, anycast EIDs can be used where there exists a mapping system per geographic region that in a first region maps an EID1 to a set of RLOCs and another region maps the same EID2 to a set of RLOCs in another region, where, the RLOC-set in each optimizes the number of hops needed to reach the service within the region.

By contrast, one of multiple RLOCs listed in a mapping for an EID can be selected for the EID based on change in RLOC state rather than EID state. For instance, each RLOC that is listed for an EID in a mapping may have associated meta data that reflects parameters of the service associated with the RLOC. For example, each RLOC's meta data may include a cost profile. The function call process is designed to select the cheapest RLOC for the EID. Over time, the cost of the RLOCs can change and the RLOC mapping for the EID is continually updated to reflect the new cost(s) for the EID's RLOCs as they change. Thus, over time the EID will continually select the cheapest RLOCs as the costs of the various RLOCs change.

Figure 4:
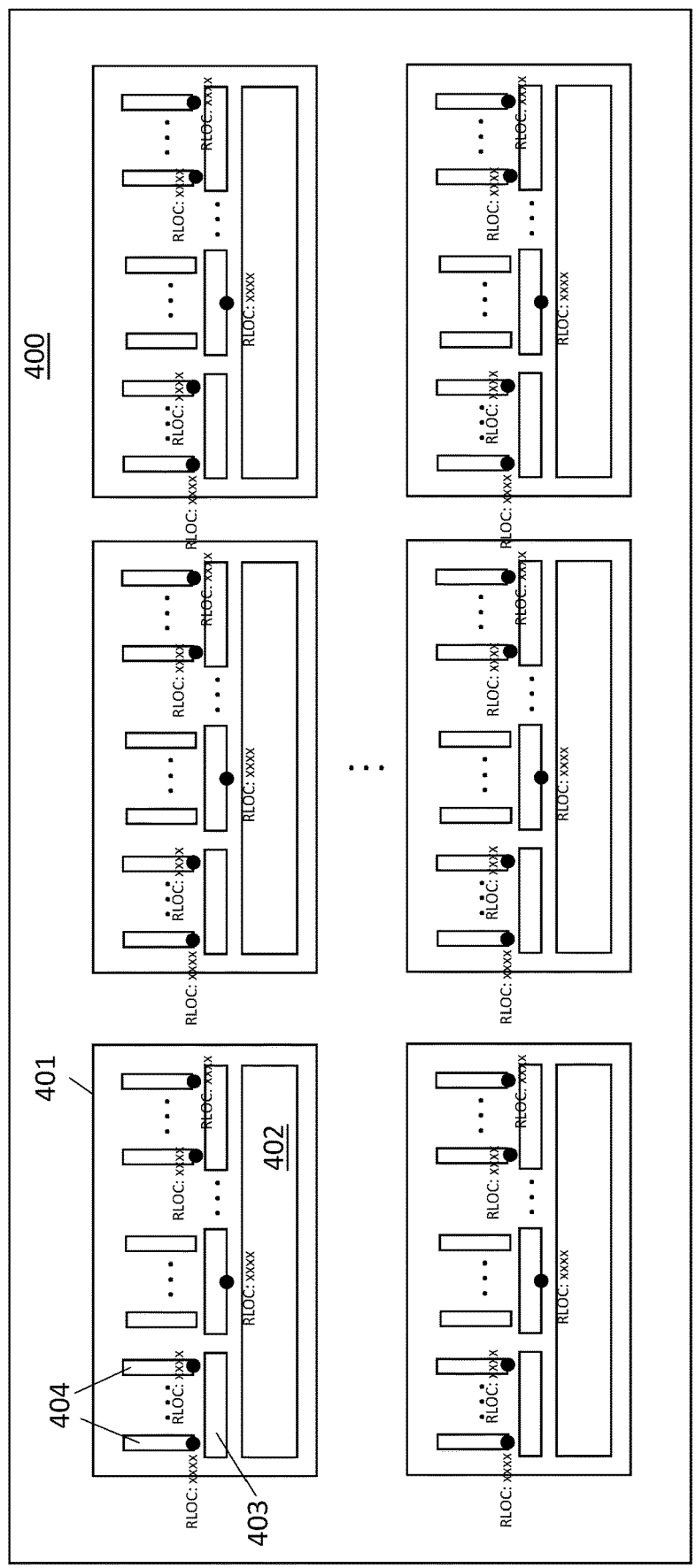
FIG. 4 shows an exemplary distribution of RLOCs for a service provider.

FIG. 4 depicts one or more endpoints of a service provider and their associated RLOCs. Here, as observed in FIG. 4 the service provider's endpoints include multiple servers 401 each having a hypervisor (or virtual machine monitor) 402. For ease of drawing, only one server 401 and hypervisor 402 are labeled in FIG. 4. Additionally, again for ease of drawing, only one hypervisor is depicted per server, whereas, in actual implementation, potentially more than one hypervisor may be instantiated per server. Each hypervisor 402 supports the execution of multiple virtual machines 403 (again, only one virtual machine is labeled 403). Each virtual machine 403 supports the execution of multiple application software instances 404 (the application instances may be instances of a same application or different applications). Here, in many cases, the function calls received by the service provider 400 are presumed to target specific applications (e.g., the EID for a particular application lists some/all of the functions supported by that application's application programming interface (API)).

As observed in FIG. 4, some application instances have their own individual RLOC. As such, any received function call that identifies the RLOC of a particular application instance is directed specifically to that application instance. By contrast, other configurations depict RLOCs that are associated with a virtual machine. In an embodiment, if an RLOC is associated with a virtual machine, a function call that is directed to that RLOC can be executed by any application instance that runs on that virtual machine (and/or an operating system instance that executes between the virtual machine and the application software instances) and/or invoke the virtual machine directly. Although not depicted in FIG. 4, if an RLOC is associated with a hypervisor, a function call that is directed to that RLOC can be executed by any application instance that runs on any virtual machine that executes on that hypervisor, and/or, invoke the hypervisor directly.

Defining different granularities as to how many applications an RLOC corresponds can be used by a service provider, e.g., to support different QoS. For example, consider an RLOC assigned to a hypervisor that supports multiple virtual machines, where, each virtual machine supports identical instance(s) of application software. Here, any received function call that targets the hypervisor (because it references the hypervisor's RLOC) can conceivably be dispatched to any application instance on any virtual machine. If the service provider sufficiently monitors customer usage of these applications, the service provider can, e.g., ensure that some number of virtual machines are (statistically expected to be) available for any received function call, which, in turn, ensures the function call will not be queued waiting for an application to execute it.

Referring back to FIG. 1, with respect to both the request 108 and response 109 queues, in various embodiments either or both of these queues 108, 109 are implemented with (distributed or centralized) immutable databases to track the execution, at a job/command/instruction level, of each business logic workflow that the framework 101 executes. Such tracking can be used to support, e.g., billing (e.g., customers are billed based on observation of which DAGs/customers have used which function calls), statistical monitoring of business logic execution, etc.

It is pertinent to point out that one or more of the cloud service providers 120 can be cloud storage providers whose service is to store data of the business logic workflow that execute on the framework. Here, the RLOC of a cloud storage service can point to a particular storage device (e.g., solid state drive, hard disk drive) of the service provider, a storage server or storage sled of the service provider, a cluster of storage sleds, etc. Thus, RLOCs can be defined not only for varying degrees of granularity for business logic execution but also for storage.

Although embodiments above have described the embedding of EID values into a workflow description as part of the compilation process, note that in at least some instances or embodiments an RLOC may be embedded as the destination of a function call in the workflow description itself. So doing removes any EID to RLOC lookup performed by an execution worker node in the distributed execution component 105 (because the RLOC is already embedded as the destination for the call in the job that has been dispatched to the worker node).

Although embodiments above have described the RLOC resources as being resources of a cloud service, note that the overall architecture is capable of using any processing and/or storage resource that is reachable through a network as an RLOC. That is, for instance, the RLOCs observed FIG. 1 need not be limited solely to cloud service RLOCs 120 but can also extend to, e.g., any client device (e.g., a smart appliance (camera, watch, smart-glasses, etc.), a smartphone, laptop computer, a desktop computer, etc.). Thus, so long as such a client device is configured so its processing resources (e.g., CPU) and/or storage resources are made open/available to receive function calls for one or more EIDs, such client devices can be assigned an RLOC and listed in mapping 112 of FIG. 1.

In the above description, the RLOC was described essentially as a network address component that, by itself, is sufficient to route a function call to the network endpoint where a service is actually performed. In various embodiments, the network address as submitted to the network, includes both an RLOC component and an EID component. Here, the RLOC component serves as a higher lever ("coarse") component of the network address that causes a packet to reach an approximate geological/topological region of the network that is in the vicinity of the desired endpoint. The EID component is then used as a lower level ("fine") component of the network address that is used by the network to actually reach the desired network endpoint/service.

Here, the various embodiments described above can embrace this particular approach by constructing in the header of a packet having a function call a network destination address having both the RLOC and EID components. Here, the RLOC component will cause the packet to be routed to the approximate geo-graphical/topological region of the destination (e.g., specific cloud service gateway) and the EID will cause the packet to be routed to the ultimate destination endpoint (e.g., specific VM of the cloud service provider). Using the EID in this way allows, e.g., for easy change by a service provider of the physical resources that perform an actual function (e.g., a service provider can "upgrade" a particular EID by causing the EID to route to a higher performance VM within the service provider's IT infrastructure). So doing, of course, could change associated meta data for that EID which, in turn, would cause different EID query results potentially moving forward.

Regardless, in various embodiments the RLOC can be the entire network destination address, or, just a component of a destination address.

Further still, various embodiments can still adopt the architecture of FIG. 1 without employing the use of a network overlay (RLOCs and EIDs). For example, as just one possibility, the workflow description can be embedded with links to particular APIs or instances of APIs of cloud services and/or other network available services.

Finally, although the discussion above assumed "multi-step" workflows and/or processes (e.g., multiple loops of control and/or execution worker node instantiations, and/or, more than one function call per workflow/process), the reader should understand that "single-step" flows/processes can also be executed by way of the above described architecture. For example, the DAG is described by only a single "box" resulting in the creation of only one control worker node and execution worker node to complete the workflow from beginning to end.

Distributed Taxi Service Bidding System

FIGS. 5a, 5b and 5c illustrate the architectural components of an almost entirely decentralized taxi service using the respective wireless mobile devices (e.g., smartphones) of riders and drivers in a common geographic area. As explained in more detail below, the taxi service attempts to match riders and prospective drivers in a same geographic area through a decentralized bid/auction process.

FIG. 5a depicts an electronic map that both riders and drivers maintain on their respective mobile devices. As can be observed in FIG. 5a, the map divides the larger geographic region into smaller zones. According to the particular approach of FIG. 5a, the smaller zones are hexagonal shaped (e.g., akin to Uber's H3 geospatial indexing system). With the mobile device of each rider and driver maintaining an electronic instance of the zoned map, and with each such device having GPS functionality, each mobile device is able to precisely identify its location on the map and which zone it is presently within.

As observed in FIG. 5b, in any geographic area, there may be multiple wireless service providers 501, 502, 503 each of which enable their respective customers, including the taxi service's riders (R) and drivers (D), access to the Internet 504. Here, anytime a driver's mobile device detects on its local electronic map that it is leaving one zone and entering another zone, it registers the zone change with a mapping system 505, which is reachable through the Internet 504.

The mapping system 505 tracks which drivers are in which geographic zone in real time. According to one embodiment, as observed in FIG. 5c, the mapping system 505 is structured to list, for each different zone in the electronic map, the respective RLOC (e.g., email address, cell phone number, etc.) of the mobile device of each driver that is currently registered within the zone. Specifically, the mapping system 505 associates a list of driver RLOCs within a same zone with a particular EID that is unique for that zone. Here, according to one approach, the EID is determined from a numeric computation (e.g., a hash) on the zone identifier from the map that a particular RLOC list corresponds to.

For example, if a driver's smartphone detects that it has left a first zone and entered a second zone, the driver's smartphone performs a hash on the map's identifier of the second zone to determine the EID for the list of driver RLOCs for the second zone. The driver's smartphone then sends a message to the mapping system 505 that includes: 1) the RLOC of the driver's smartphone; 2) the newly calculated EID for the second zone with an indication that the EID corresponds to the zone being newly entered; and, 3) the EID for the first zone (which was generated when the driver first entered the first zone and was kept by the driver's smartphone thereafter) with an indication that the EID corresponds to the zone being departed from. Note that 1) above can be the network layer source address for a packet that includes 2) and 3) above in its payload.

The mapping system 505, upon receiving the message, updates the respective RLOC lists that are maintained for both of the EIDs that were included in the message. Specifically, the mapping system removes the RLOC for the driver's smartphone from the RLOC list that is maintained for the EID associated with the first zone, and, adds the RLOC for the driver's smartphone to the RLOC list that is maintained for the EID associated with the second zone. In this manner, the mapping system formally updates the driver's location as having left the first zone and entered the second zone.

With the same hash/algorithm included in the application software of all drivers, and following the above described process for all drivers, the mapping system 505 is able to readily maintain a current EID based list of driver RLOCs for all zones in the mapping system. Note that the driver's application software can maintain a cache that maps a number of the most recent zones that the driver has entered to the zone's corresponding EID. By so doing, the calculation of the hash can be avoided if a driver repeatedly enters and/or leaves same zones (instead, the driver's smartphone looks up the EID for a zone directly from the cache).

FIGS. 6a through 6d depict rider and driver mobile device behaviors in conjunction with a bidding process where multiple drivers bid for a rider's request for a ride. A bidding process starts with an indication from the rider that the rider needs a ride (e.g., through selection of a menu item on the rider's taxi service application software). In response to such an indication, or beforehand, the rider's taxi service application software determines the EID for the zone that the rider is presently within. Here, the application software compares the rider's GPS position to the locally stored map to determine the zone. The corresponding EID is then determined with the same algorithm/hash used by the drivers' respective mobile devices (so that same zones will produce same EIDs for riders and drivers).

Figure 6A:
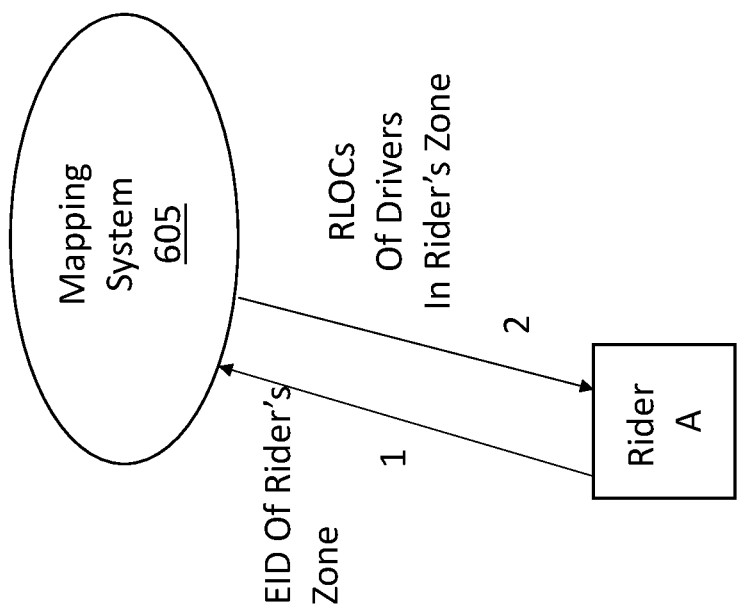

Then, as observed in FIG. 6a, the EID is incorporated in a message that is sent 1 to the mapping system 605. The mapping system 605 fetches the list of driver RLOCs that are currently listed for that EID and sends 2 them back to the rider's smartphone. In extended embodiments, the mapping system 605 not only sends the rider the driver RLOCs for the zone that the rider is in, but also, one or more zones that surround the rider's zone (the mapping system maintains its own copy of the map and can determine EIDs of map zones). In further embodiments, RLOC lists of surrounding zones are only sent if the number of RLOCs listed for the rider's zone falls beneath some threshold.

Figure 6B:
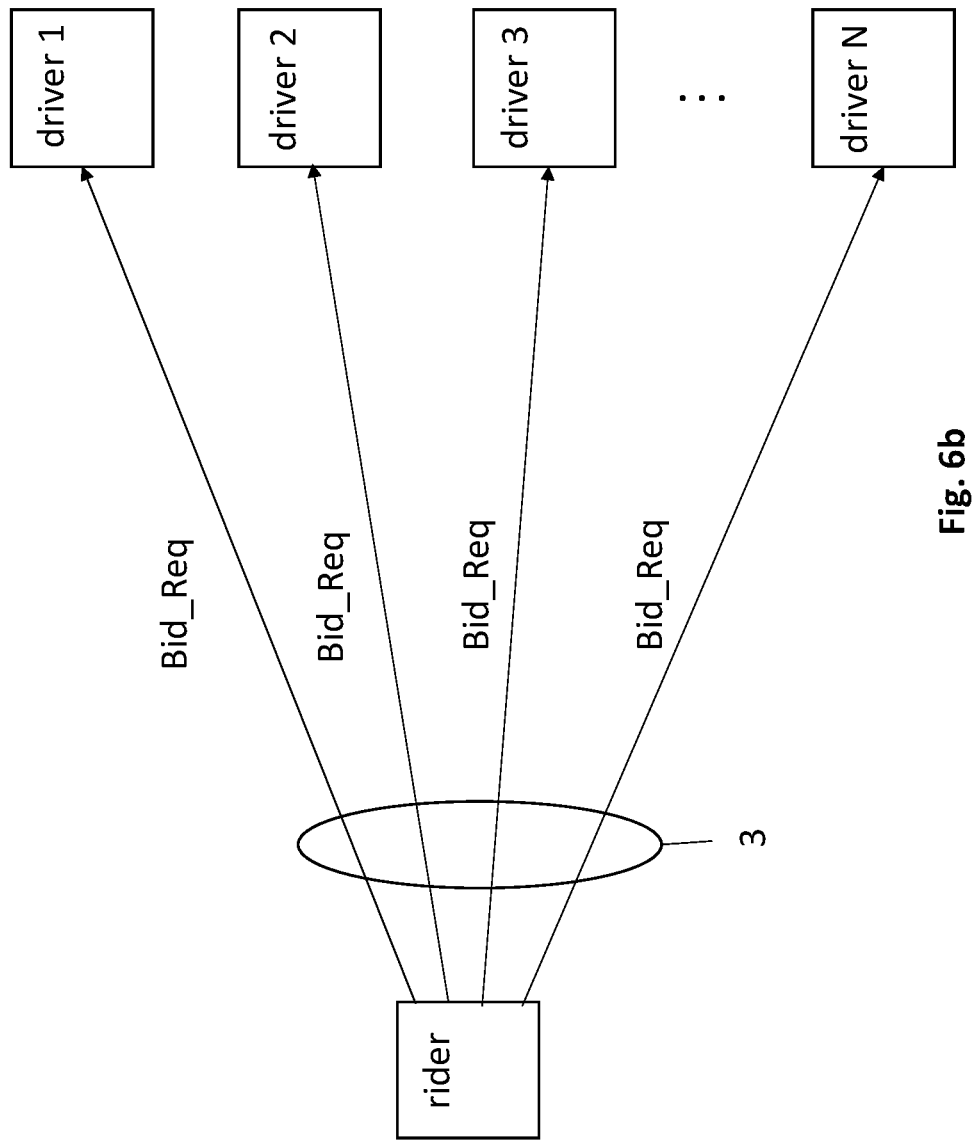

As observed in FIG. 6b, the rider's smartphone then sends 3 a separate unicast message to each driver whose RLOC was listed for the EID. In an embodiment, each message sent to a particular driver uses the driver's RLOC as a network layer destination address (or component thereof) and the rider's RLOC as a network layer source address (or component thereof). Each message can also include an EID that uniquely identifies the rider. The payload of each message essentially describes characteristics of the rider's requested ride and associated bid auction. This generally includes the rider's current GPS location (and/or equivalent address), the rider's desired destination and the number of riders who will be riding.

Additionally, customized preferences of the rider can also be included such as any/all of: 1) requested car size, type, etc.: 2) driver gender; 3) desired wait time (time for the driver to reach the rider); 4) driver age; 5) whether the driver has been vetted (e.g., by the taxi service or some standardized or state driver licensing or qualifying program) or other criteria that a driver must meet in order for the rider to consider the driver's bid. Each of the drivers' smartphones then process their respective message's payload.

Figure 6C:
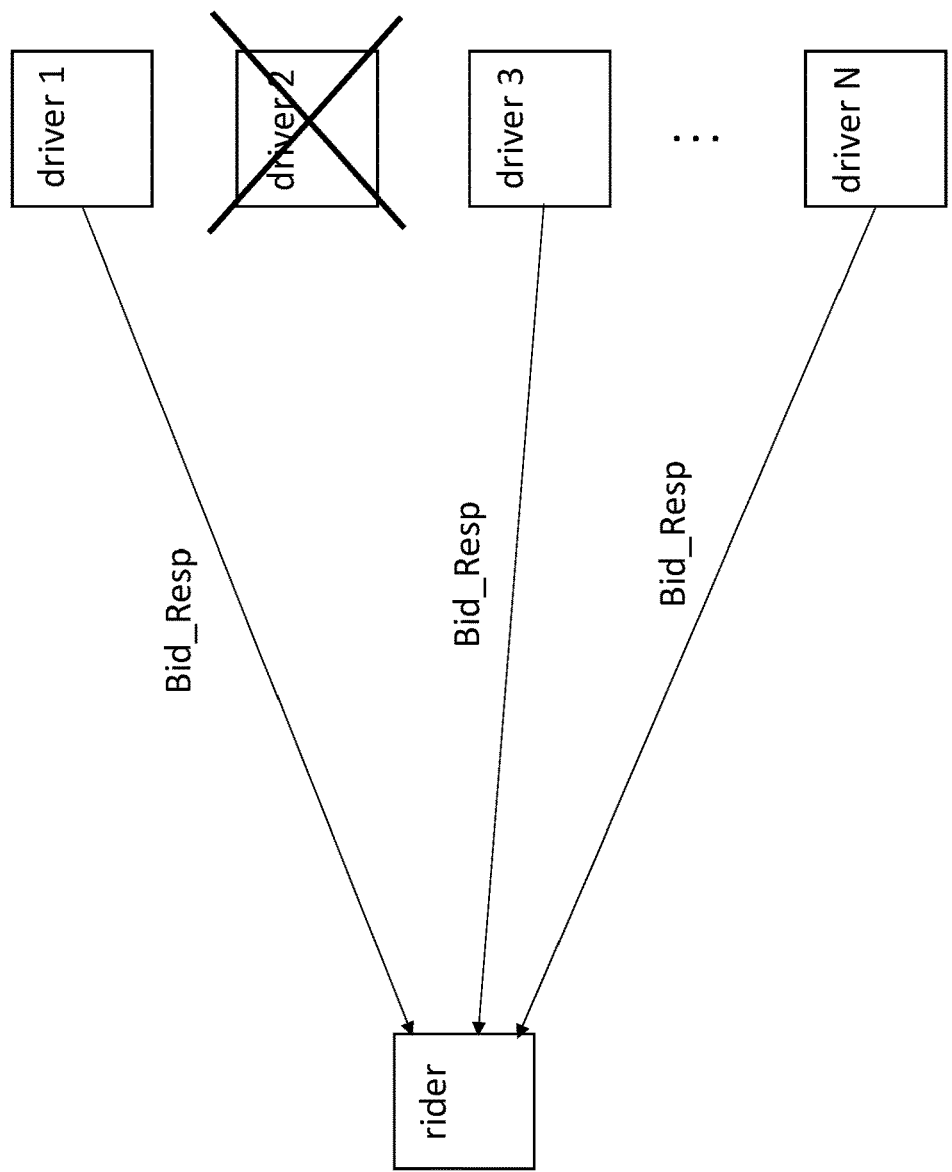

As observed in FIG. 6c, if the processing of the message by any driver device determines that the respective driver does not meet the rider's criteria, the device either does not send a response to the bid request, or, sends an affirmative "no bid" response back to the rider's device. Note that the driver can also look for characteristics of the rider (e.g., gender, age, whether the rider has been vetted) to determine whether a bid is to be submitted. In this case, the rider's original unicast message should also include characteristics of the rider so that the driver devices can screen against their respective criteria requirements. As observed in FIG. 6c, driver 2 has decided not to bid.

If the processing determines that the driver meets the specified criteria, the driver's device calculates a proposed fee for the ride and sends a response to the rider. The response can also include and respective EID for the driver that is sending a particular response and variable information that the rider can use to determine a bid winner (such as expected wait time). FIG. 6c shows drivers 1, 3 and N submitting bids.

The rider receives and processes the bid responses. If not enough bid responses are received, as one option, the rider can send a second set of messages to drivers from zones other than the rider's zone (the RLOCs of the drivers for any such zones can be provided by the mapping system 605 as discussed above with respect to FIG. 6a). At some point, the rider's taxi service software will recognize it has received as many bids as it can reasonably expect. Ultimately, a time out process that starts with the sending of the original bids can be used to establish when all bid responses must be received.

Once the rider's taxi service software recognizes it has received the set of bids for the requested ride, it determines a winning bid from them. The winner is typically determined from factors such as lowest cost and wait time. However, other criteria can be used such as driver age, driver gender, etc (which can also be included in the bid responses). In various embodiments, after a winner is initially selected, the rider's taxi service software causes follow-up messages to be sent to the other, losing drivers to see if any of these drivers desire to enter a cheaper bid or otherwise more competitive bid. In this case, the follow-up message indicates that the recipient was not chosen and includes the winning bid price.

Figure 6D:
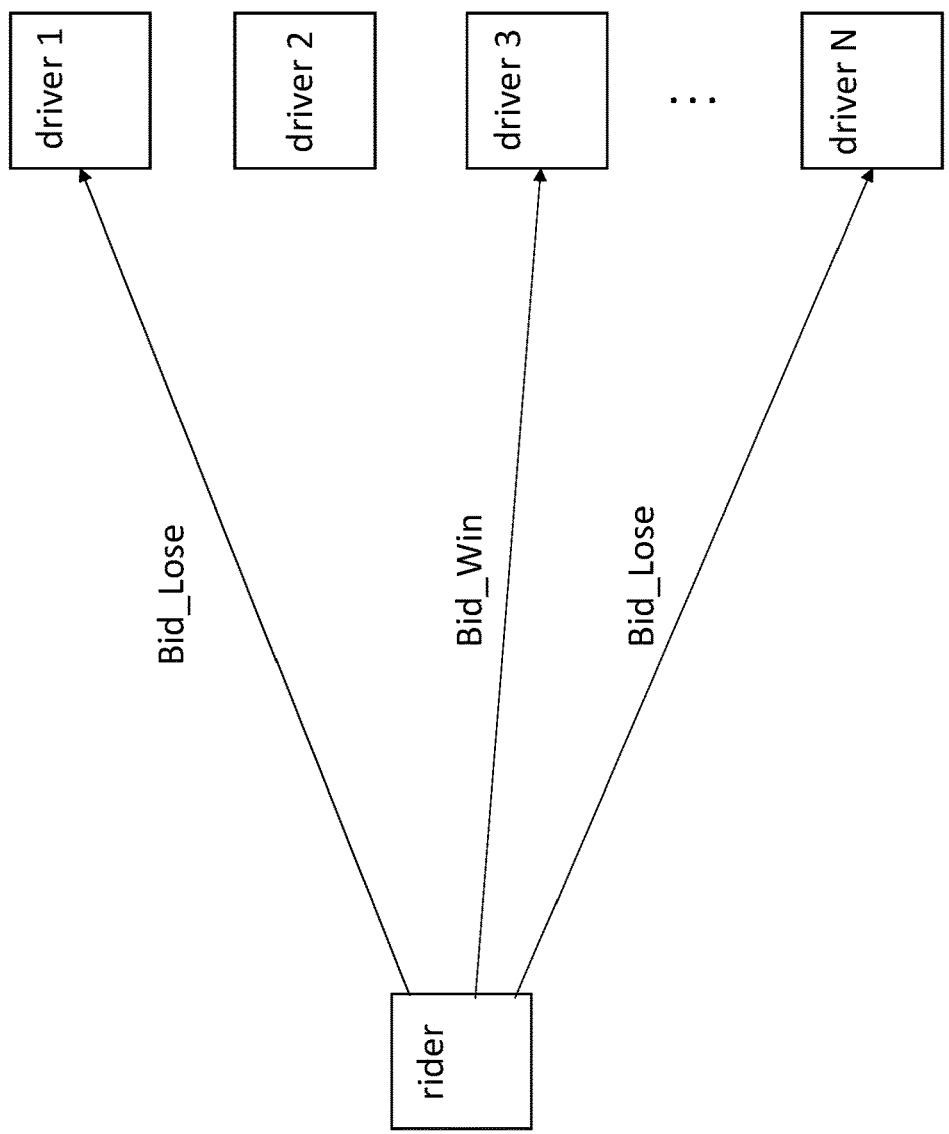

The devices of the drivers that did not win the initial bid then process the follow-up message according to some criteria and decide whether or not a cheaper bid is to be sent. If so, a cheaper bid is sent back to the rider. If not, no response to the message is sent, or, an affirmative no bid message is sent to the rider. If a cheaper bid is received and accepted, the initial winning driver is informed of the new, lower bid and is asked if the driver would like to offer another lower bid. The process continues between bidding drivers until a winning driver is finally chosen or only a single, lowest bidding driver remains. FIG. 6d shows driver 3 being deemed the winner.

It is pertinent to point out that the mapping system 505, 605 maintains little or no private information of the riders and/or drivers. For instance, the gender, age and vetting status of the rider and/or the selection criteria for a ride that is specified by the rider for a ride can be maintained solely by the rider's device. Likewise, the characteristics of a driver (age, gender, vetting status) that establishes to what extent the driver can meet any criteria specified by a rider, or what characteristics of a rider the driver considers when responding to a bid request, can likewise be maintained only on the driver's device. The mapping system 505, 605 or other feature of the taxi service need not maintain any of this information.

As such, the architecture of the taxi service has built in privacy protection of its registered riders and drivers. Moreover, according to various embodiments, riders and drivers can each have a unique RLOC and EID, where, the RLOC information of other riders and/or drivers is kept "hidden" in the network layer software/firmware of the mobile device of any particular rider or driver.

That is, for instance, as described above, the taxi service application software that executes on a rider's smartphone when causing the initial bid request to be sent only refers to the drivers in the rider's zone with the EID for the zone. The application has no vision or is otherwise not given any access to the RLOCs of the drivers within the zone which is maintained, e.g., in a secure manner in the networking layer segment of the rider's phone's communication protocol stack. When bidding drivers send responses that each include a unique EID for each driver, the networking layer of the rider's smartphone again suppresses any RLOC information and only passes EID information of the drivers up to the taxi service software (the taxis service software only receives the EIDs of the bidding drivers).

If the rider's taxi service software decides to send a message to any specific rider (e.g. notification of a win, or notification of a loss and an inquiry to re-bid), the taxi service refers to the driver by the driver's EID. The rider's networking layer function then converts that EID to the RLOC fo the specific driver. Thus, the networking layer of the rider's phone maintains an EID to RLOC mapping of each driver that has responded to the initial bid request. In an alternate approach, the EID for each driver can be included in the mapping system entry for that driver's RLOC and is included in the message 2 sent from the mapping system to the rider that lists the RLOCs within the rider's zone.

Additionally, recalling the discussion of FIG. 6a, in a specific implementation, recall that the taxi service software first determines an EID for the zone that the rider is in (by hashing the zone identifier from the electronic map). The taxi application software then submits the EID to the networking layer of the rider's phone as part of an outgoing bid request message. The networking layer, upon realizing that it does not have any RLOCs for the specific EID, sends the initial message 1 to the mapping system 605 that requests the RLOCs for the EID. When the return message is received with the RLOCs, the networking layer securely stores them and sends unicast messages to each of the individual RLOCs (again, each listed RLOC can also include an EID that is unique to its corresponding driver).

The networking layer may be configured to keep the RLOCs in the rider's mobile device, e.g., in a secure local cache, so that if the rider desires to send another bid (e.g., to see if the losing drivers want to submit a more competitive bid) it can reuse the RLOCs directly from the local cache rather than request them again from the mapping system. However, because drivers are apt to enter and leave the zone over time, RLOC lists for a particular zone EID are regularly flushed from the local cache thereby requiring another request to the mapping system 605 for RLOCs should the driver later want to send other unrelated bids from the zone. Accordingly, the rider's mobile device will use current RLOC lists.

With respect to the driver side application software, recall that the initial bid message that is sent from the rider's device to each of the riders can include an EID for the rider. Here, in an embodiment, the RLOC of the rider's device is used as a networking layer destination address (or component thereof) which is kept hidden from the drivers' taxi service application software. The EID for the rider, however, is passed up to the drivers' taxi application software along with any message payload. Thus, in terms of information that identifies the rider, the drivers do not see the rider's RLOC and only see the rider's EID.

Again, rider and driver EIDs can be generic alphanumeric sequences that do not include any information that identifies the person who the corresponding rider or driver actually is (name, etc.). As such, the rider can submit a bid without any identifying information of the rider being passed to the drivers, and, likewise, the drivers can submit bids without any identifying information of the drivers being passed to the rider.

Finally, with respect to the electronic map information, each rider or drivers mobile device can request more map information (e.g., from the source of electronic map such as Google Maps or some other on-line mapping resource) upon the device realizing from its current GPS position that is does not posses map information for the corresponding or nearby zones.

FIG. 7 provides an exemplary depiction of a computing system 700 (e.g., a smartphone, a tablet computer, a laptop computer, a desktop computer, a server computer, etc.). As observed in FIG. 7, the basic computing system 700 may include a central processing unit 701 (which may include, e.g., a plurality of general purpose processing cores 715_1 through 715_X) and a main memory controller 717 disposed on a multi-core processor or applications processor, system memory 702, a display 703 (e.g., touchscreen, flat-panel), a local wired point-to-point link (e.g., USB) interface 704, various network I/O functions 705 (such as an Ethernet interface and/or cellular modem subsystem), a wireless local area network (e.g., WiFi) interface 706, a wireless point-to-point link (e.g., Bluetooth) interface 707 and a Global Positioning System interface 708, various sensors 709_1 through 709_Y, one or more cameras 710, a battery 711, a power management control unit 712, a speaker and microphone 713 and an audio coder/decoder 714.

An applications processor or multi-core processor 750 may include one or more general purpose processing cores 715 within its CPU 701, one or more graphical processing units 716, a memory management function 717 (e.g., a memory controller) and an I/O control function 718. The general purpose processing cores 715 typically execute the operating system and application software of the computing system. The graphics processing unit 716 typically executes graphics intensive functions to, e.g., generate graphics information that is presented on the display 703. The memory control function 717 interfaces with the system memory 702 to write/read data to/from system memory 702. The power management control unit 712 generally controls the power consumption of the system 700.

Each of the touchscreen display 703, the communication interfaces 704-707, the GPS interface 708, the sensors 709, the camera(s) 710, and the speaker/microphone codec 713, 714 all can be viewed as various forms of I/O (input and/or output) relative to the overall computing system including, where appropriate, an integrated peripheral device as well (e.g., the one or more cameras 710). Depending on implementation, various ones of these I/O components may be integrated on the applications processor/multi-core processor 750 or may be located off the die or outside the package of the applications processor/multi-core processor 750. The computing system also includes non-volatile mass storage 720 which may be the mass storage component of the system which may be composed of one or more non-volatile mass storage devices (e.g. hard disk drive, solid state drive, etc.). The non-volatile mass storage 720 may be implemented with any of SSDs, HDDs, an emerging resistive, three-dimensional non-volatile memory (e.g., Optane from Intel), etc.

One or more computers such as a computer having some or all of the components of FIG. 7 can be used to implement (e.g., via execution of software) any/all of the framework 101, network overlay 110 and/or any of the RLOC based services discussed above with respect to FIG. 1. Likewise, one or more computers such as a mobile device (e.g., smartphone) having some or all of the components of FIG. 7 can be used to implement (e.g., via execution of software) any/all of the workflows discussed above with respect to FIGS. 5a-5c and 6a-6d.

Embodiments of the invention may include various processes as set forth above. The processes may be embodied in program code (e.g., machine-executable instructions). The program code, when processed, causes a general-purpose or special-purpose processor to perform the program code's processes. Alternatively, these processes may be performed by specific/custom hardware components that contain hard interconnected logic circuitry (e.g., application specific integrated circuit (ASIC) logic circuitry) or programmable logic circuitry (e.g., field programmable gate array (FPGA) logic circuitry, programmable logic device (PLD) logic circuitry) for performing the processes, or by any combination of program code and logic circuitry.

Elements of the present invention may also be provided as a machine-readable medium for storing the program code.

The machine-readable medium can include, but is not limited to, floppy diskettes, optical disks, CD-ROMs, and magneto-optical disks, FLASH memory, ROMs, RAMs, EPROMs, EEPROMs, magnetic or optical cards or other type of media/machine-readable medium suitable for storing electronic instructions.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method, comprising:
   building a description of a workflow;
   creating an embedded workflow description by embedding the description of the workflow with logical identifiers of different instances of services that are available over a network;
   repeatedly performing a) and b) below to execute the embedded workflow:
   a) dispatching the embedded workflow to a control worker node within a pool of free control worker nodes, the control worker node referring to the embedded workflow description and issuing a job request that defines one or more next operations of the workflow upon the control worker node recognizing that execution of the next one or more operations is appropriate in view of the workflow's state, the next one or more operations including a function call to a service identified by one of the logical identifiers;
   b) dispatching the job request to an execution worker node within a pool of free execution worker nodes, the execution worker node executing the next one or more operations including mapping the logical identifier of the service to a physical location of the service, incorporating the physical location and the function call into a packet and sending the packet over the network.

2. The method of claim 1 wherein the method further comprises submitting a query for the function call prior to execution of the workflow, and, receiving a response to the query that includes logical identifiers for a subset of the services that are able to perform the function.

3. The method of claim 2 wherein the response also includes information selected from the group consisting of:
   a geographic location for each of the subset of services;
   a cost structure for each of the subset of services.

4. The method of claim 3 wherein the method further comprises:
   selecting a respective one of the subset of services based on the information;
   embedding a respective logical identifier of the respective one of the subset of services into the embedded workflow description and associating the respective logical identifier with the function call.

5. The method of claim 2 wherein the query includes a search term other than the function call.

6. The method of claim 1 wherein the logical identifier and the physical identifier are compatible with the Location/Identifier Separation Protocol (LISP).

7. The method of claim 1 wherein at least one of the services is a cloud service.

8. The method of claim 1 wherein the method further comprises the control worker node updating the embedded workflow description with any of:
   the workflow's state;
   one or more conditions that are to be met before the workflow can advance from the workflow's state.

9. The method of claim 8 wherein the one or more conditions includes completion of the job request.

10. The method of claim 1 wherein either or both of the job request and a response to the job request is entered in an immutable database.

11. The method of claim 1 further comprising referring to the database to perform any of the following:
    tracking execution of the workflow;
    tracking execution of multiple workflows including the workflow;
    understanding costs incurred by the workflow for networked function calls to one or more of the service providers.

12. A method performed by a rider's mobile device, comprising:
    determining which zone of an electronic map that the rider's device is currently within;
    determining an EID from an identifier of the zone and sending the EID to a mapping system that tracks which drivers are currently within which zones of a geographic area described by the electronic map;
    receiving from the mapping system a list of RLOCs of drivers that are currently within the zone;
    sending a bid request for a ride to the drivers, each message including one of the RLOCs so that the message reaches a corresponding mobile device of a particular one of the drivers;
    receiving bid responses from at least a subset of the drivers and determining a winner therefrom.

13. The method of claim 12 wherein the bid request includes preferences of the rider.

14. The method of claim 13 wherein the preferences include at least one of:
    rider age;
    rider gender;
    whether a recipient rider has been vetted by a rider qualification process.

15. The method of claim 13 wherein at least one of the riders does not send a bid response because the rider does not meet the preferences of the rider.

16. The method of claim 12 wherein application software that executes above networking layer software on the rider's phone identifies riders by respective driver EIDs.

17. The method of claim 16 wherein application software that executes above networking layer software on each of the drivers' phones identifies the rider by a rider EID.

18. The method of claim 17 wherein the rider EID is included in the bid request.

19. The method of claim 12 wherein the zones are hexagonal shaped and the electronic map is part of an H3 geospatial indexing system.

20. A method, comprising:
    building a description of a workflow;
    repeatedly performing a) and b) below to execute the workflow:
    a) dispatching the description of the workflow to a control worker node within a pool of free control worker nodes, the control worker node referring to the description of the workflow and issuing a job request that defines one or more next operations of the workflow upon the control worker node recognizing that execution of the next one or more operations is appropriate in view of the workflow's state, the next one or more operations including a function call to a service that is available over a network;

b) dispatching the job request to an execution worker node within a pool of free execution worker nodes, the execution worker node executing the next one or more operations including invoking the function call.

21. A method, comprising:

building a description of a workflow;

dispatching the description of the workflow to a control worker node within a pool of free control worker nodes, the control worker node referring to the description of the workflow and issuing a job request that defines one or more next operations of the workflow upon the control worker node recognizing that execution of the next one or more operations is appropriate in view of the workflow's state, the next one or more operations including a function call to a service that is available over a network;

dispatching the job request to an execution worker node within a pool of free execution worker nodes, the execution worker node executing the next one or more operations including invoking the function call.

22. At least one machine readable storage medium containing program code instructions that when processed by at least one processor causes a method to be performed, the method, comprising:

building a description of a workflow;

creating an embedded workflow description by embedding the description of the workflow with logical identifiers of different instances of services that are available over a network;

repeatedly performing a) and b) below to execute the embedded workflow:

a) dispatching the embedded workflow to a control worker node within a pool of free control worker nodes, the control worker node referring to the embedded workflow description and issuing a job request that defines one or more next operations of the workflow upon the control worker node recognizing that execution of the next one or more operations is appropriate in view of the workflow's state, the next one or more operations including a function call to a service identified by one of the logical identifiers;

b) dispatching the job request to an execution worker node within a pool of free execution worker nodes, the execution worker node executing the next one or more operations including mapping the logical identifier of the service to a physical location of the service, incorporating the physical location and the function call into a packet and sending the packet over the network.

23. The at least one machine readable storage medium of claim 22 wherein the method further comprises submitting a query for the function call prior to execution of the workflow, and, receiving a response to the query that includes logical identifiers for a subset of the services that are able to perform the function.

24. The at least one machine readable storage medium of claim 23 wherein the response also includes information selected from the group consisting of:

a geographic location for each of the subset of services;

a cost structure for each of the subset of services.

25. The at least one machine readable storage medium of claim 24 wherein the method further comprises:

selecting a respective one of the subset of services based on the information;

embedding a respective logical identifier of the respective one of the subset of services into the embedded workflow description and associating the respective logical identifier with the function call.

26. The at least one machine readable storage medium of claim 23 wherein the query includes a search term other than the function call.

27. The at least one machine readable storage medium of claim 22 wherein the logical identifier and the physical identifier are compatible with the Location/Identifier Separation Protocol (LISP).

28. The at least one machine readable storage medium of claim 22 wherein at least one of the services is a cloud service.

29. The at least one machine readable storage medium of claim 22 wherein the method further comprises the control worker node updating the embedded workflow description with any of:

the workflow's state;

one or more conditions that are to be met before the workflow can advance from the workflow's state.

30. The at least one machine readable storage medium of claim 29 wherein the one or more conditions includes completion of the job request.

31. The at least one machine readable storage medium of claim 22 wherein either or both of the job request and a response to the job request is entered in an immutable database.

32. The method of claim 22 further comprising referring to the database to perform any of the following:

tracking execution of the workflow;

tracking execution of multiple workflows including the workflow;

understanding costs incurred by the workflow for networked function calls to one or more of the service providers.

33. One or more computing systems configured to execute program code stored on one or more machine readable storage mediums, such that, when the program code is executed by the one or more computing systems a method is performed, the method comprising:

building a description of a workflow;

creating an embedded workflow description by embedding the description of the workflow with logical identifiers of different instances of services that are available over a network;

repeatedly performing a) and b) below to execute the embedded workflow:

a) dispatching the embedded workflow to a control worker node within a pool of free control worker nodes, the control worker node referring to the embedded workflow description and issuing a job request that defines one or more next operations of the workflow upon the control worker node recognizing that execution of the next one or more operations is appropriate in view of the workflow's state, the next one or more operations including a function call to a service identified by one of the logical identifiers;

b) dispatching the job request to an execution worker node within a pool of free execution worker nodes, the execution worker node executing the next one or more operations including mapping the logical identifier of the service to a physical location of the service, incorporating the physical location and the function call into a packet and sending the packet over the network.

34. The one or more computing systems of claim 33 wherein the method further comprises submitting a query for the function call prior to execution of the workflow, and, receiving a response to the query that includes logical identifiers for a subset of the services that are able to perform the function.

35. The one or more computing systems of claim 34 wherein the response also includes information selected from the group consisting of:
   a geographic location for each of the subset of services;
   a cost structure for each of the subset of services.

36. The one or more computing systems of claim 35 wherein the method further comprises:
   selecting a respective one of the subset of services based on the information;
   embedding a respective logical identifier of the respective one of the subset of services into the embedded workflow description and associating the respective logical identifier with the function call.

37. The one or more computing systems of claim 34 wherein the query includes a search term other than the function call.

38. The one or more computing systems of claim 33 wherein the logical identifier and the physical identifier are compatible with the Location/Identifier Separation Protocol (LISP).

39. The one or more computing systems of claim 33 wherein at least one of the services is a cloud service.

40. The medium one or more computing systems of claim 33 wherein the method further comprises the control worker node updating the embedded workflow description with any of:
   the workflow's state;
   one or more conditions that are to be met before the workflow can advance from the workflow's state.

41. The one or more computing systems of claim 40 wherein the one or more conditions includes completion of the job request.

42. The one or more computing systems of claim 33 wherein either or both of the job request and a response to the job request is entered in an immutable database.

43. The one or more computing systems of claim 33 further comprising referring to the database to perform any of the following:
   tracking execution of the workflow;
   tracking execution of multiple workflows including the workflow;
   understanding costs incurred by the workflow for networked function calls to one or more of the service providers.

44. At least one machine readable storage medium containing program code instructions that when processed by at least one processor causes a method to be performed, the method, comprising:
   building a description of a workflow;
   repeatedly performing a) and b) below to execute the workflow:
      a) dispatching the description of the workflow to a control worker node within a pool of free control worker nodes, the control worker node referring to the description of the workflow and issuing a job request that defines one or more next operations of the workflow upon the control worker node recognizing that execution of the next one or more operations is appropriate in view of the workflow's state, the next one or more operations including a function call to a service that is available over a network;
      b) dispatching the job request to an execution worker node within a pool of free execution worker nodes, the execution worker node executing the next one or more operations including invoking the function call.

45. At least one machine readable storage medium containing program code instructions that when processed by at least one processor causes a method to be performed, the method, comprising:
   building a description of a workflow;
   dispatching the description of the workflow to a control worker node within a pool of free control worker nodes, the control worker node referring to the description of the workflow and issuing a job request that defines one or more next operations of the workflow upon the control worker node recognizing that execution of the next one or more operations is appropriate in view of the workflow's state, the next one or more operations including a function call to a service that is available over a network;
   dispatching the job request to an execution worker node within a pool of free execution worker nodes, the execution worker node executing the next one or more operations including invoking the function call.

* * * * *

UNITED STATES PATENT AND TRADEMARK OFFICE
CERTIFICATE OF CORRECTION

PATENT NO. : 12,147,833 B1
APPLICATION NO. : 17/478866
DATED : November 19, 2024
INVENTOR(S) : Ashish Krishna et al.

It is certified that error appears in the above-identified patent and that said Letters Patent is hereby corrected as shown below:

In the Claims

Column 25, Lines 32-38, Claim 40 should read as follows:
The one or more computing systems of claim 33 wherein the method further comprises the control worker node updating the embedded workflow description with any of:
    the workflow's state;
    one or more conditions that are to be met before the workflow can advance from the workflow's state.

Signed and Sealed this
Twenty-fifth Day of February, 2025

Coke Morgan Stewart
*Acting Director of the United States Patent and Trademark Office*